(12) United States Patent
Lagneaux et al.

(10) Patent No.: US 12,131,337 B2
(45) Date of Patent: Oct. 29, 2024

(54) METHODS AND SYSTEMS FOR GENERATING ADDRESS SCORE INFORMATION

(71) Applicant: United States Postal Service, Washington, DC (US)

(72) Inventors: Angela M. Lagneaux, Annapolis, MD (US); Stuart Leon Krantz, Washington, DC (US); Adam Alaa-Eldin Shoeb, Washington, DC (US); Jason Ye Huang, Gaithersburg, MD (US); John Matthew Jacobson, Annapolis, MD (US); Kyle Christopher Harbacek, Arlington, VA (US)

(73) Assignee: United States Postal Service, Washington, DC (US)

( * ) Notice: Subject to any disclaimer, the term of this patent is extended or adjusted under 35 U.S.C. 154(b) by 330 days.

(21) Appl. No.: 17/067,337

(22) Filed: Oct. 9, 2020

(65) Prior Publication Data

US 2021/0110343 A1    Apr. 15, 2021

Related U.S. Application Data

(60) Provisional application No. 63/076,234, filed on Sep. 9, 2020, provisional application No. 62/913,557, filed on Oct. 10, 2019.

(51) Int. Cl.
*G06Q 30/018* (2023.01)
*G06F 16/23* (2019.01)
(Continued)

(52) U.S. Cl.
CPC ..... *G06Q 30/0185* (2013.01); *G06F 16/2365* (2019.01); *G06F 18/2321* (2023.01);
(Continued)

(58) Field of Classification Search
CPC .................................................. G06Q 30/0813
(Continued)

(56) References Cited

U.S. PATENT DOCUMENTS 10,097,353 B1 * 10/2018 Carlson ................. H04L 67/306
10,204,374 B1 *  2/2019 Holan ................ G06Q 30/0637
(Continued)

FOREIGN PATENT DOCUMENTS

JP    2004537781 A  *  5/2002  ........... G06Q 20/403
TW        I709927 B  * 11/2020  ........... G06F 16/334

OTHER PUBLICATIONS

Noh, Ji Seong, Jong Soo Kim, and Biswajit Sarkar. "Stochastic Joint Replenishment Problem with Quantity Discounts and Minimum Order Constraints." Operational research 19.1 (2019): 151-178. Web. (Year: 2019).*

*Primary Examiner* — Akiba K Robinson
(74) *Attorney, Agent, or Firm* — Knobbe Martens Olson & Bear, LLP

(57) ABSTRACT

In one aspect, a method of confirming identity of an entity is disclosed. The method comprises receiving a plurality of items for delivery to an address, obtaining, from the items, information regarding an entity associated with the items and the address, and delivering the items to the address. The method may also comprise identifying an expected identity of the entity, receiving a request to confirm an identity of the entity using third-party identity verification via a user interface, and determining, based on the information regarding the entity, a confidence score for the expected identity. The method may further comprise determining whether the confidence score is greater than or equal to the threshold value and generating a response to the request. The method may additionally comprises displaying the response via the user interface.

16 Claims, 9 Drawing Sheets

(51) Int. Cl.
*G06F 18/2321* (2023.01)
*G06N 7/01* (2023.01)
*G06Q 10/083* (2023.01)
*H04L 9/32* (2006.01)

(52) U.S. Cl.
CPC .......... *G06N 7/01* (2023.01); *G06Q 10/0838* (2013.01); *H04L 9/321* (2013.01)

(58) Field of Classification Search
USPC ................................ 705/341, 7.11, 1.1, 7.28
See application file for complete search history.

(56) References Cited

U.S. PATENT DOCUMENTS

| | | | |
|---|---|---|---|
| 2010/0042510 A1* | 2/2010 | Zeinfeld | G06Q 30/0641 |
| | | | 705/28 |
| 2016/0294856 A1* | 10/2016 | Boia | H04L 63/1425 |
| 2017/0149813 A1* | 5/2017 | Wright | H04L 63/1416 |
| 2018/0121875 A1* | 5/2018 | Satyanarayana Rao | |
| | | | G06Q 10/08355 |
| 2019/0044963 A1* | 2/2019 | Rajasekharan | G06N 20/00 |

\* cited by examiner

METHODS AND SYSTEMS FOR GENERATING ADDRESS SCORE INFORMATION

CROSS-REFERENCE TO RELATED APPLICATIONS

This application claims the benefit of priority to U.S. Provisional application No. 62/913,557 filed Oct. 10, 2019, and U.S. Provisional application No. 63/076,234 filed Sep. 9, 2020, the entire contents of each of which are hereby incorporated by referenced herein for all purposes. Any and all applications for which a foreign or domestic priority claim is identified in the Application Data Sheet as filed with the present application are hereby incorporated by reference under 37 CFR 1.57.

FIELD

This disclosure relates to scoring delivery points based on data detected and/or acquired, and in particular, to dynamically identifying patterns for one or more of the delivery points based on items sent to and/or received from the one or more delivery points and generating a score or similar analysis data based on the identified patterns.

SUMMARY

Methods and apparatuses or devices disclosed herein each have several aspects, no single one of which is solely responsible for its desirable attributes. Without limiting the scope of this disclosure, for example, as expressed by the claims, which follow, its more prominent features will now be discussed briefly. After considering this discussion, and particularly after reading the section entitled "Detailed Description" one will understand how the described features provide advantages that include data authentication services.

In one aspect, a method of confirming identity of an entity is disclosed. The method may comprises receiving a plurality of items for delivery to an address, obtaining, from the plurality of items, information regarding an entity associated with the items and the address, and delivering the plurality of items to the address. The method may also comprise identifying, based on the obtained information, an expected identity of the entity, receiving a request to confirm an identity of the entity using third-party identity verification via a user interface, and determining, based on the information regarding the entity, a confidence score for the expected identity, wherein the confidence score is a measure of a confidence that the expected identity accurately identifies the entity. The method may further comprise comparing the confidence score to a threshold value, determining whether the confidence score is greater than or equal to the threshold value, and generating a response to the request, the response including the confidence score and a result of the determining whether the confidence score is greater than or equal to the threshold value. The method may additionally comprises displaying the response via the user interface.

In some aspects, determining the confidence score for the expected identity comprises calculating a total number of items delivered to the address, a number of items delivered to the entity, and a number of items delivered to each other entity associated with the address. Additionally, determining the confidence score for the expected identity further comprises generating a probability score for the entity by dividing the number of items delivered to the entity by the total number of items delivered to the address. In some aspects, the method further comprises applying probabilistic modeling to the probability score for the entity to generate the confidence score for the entity and, when the confidence score is greater than or equal to the threshold value, applying the third party identity verification to confirm the identity of the entity.

In another aspects, the another method is disclosed. The method comprises receiving a plurality of items for delivery to a specific address, obtaining, from the plurality of items, information regarding the items and the specific address, and delivering the plurality of items to the specific address. The method may further comprise identifying a request to identify addresses associated with a specific behavior, determining, based on the information regarding the address, a risk score for the specific address, wherein the risk score is a measure of the likelihood that the specific address is associated with the specific behavior, and comparing the risk score to a threshold value. Additionally, the method may comprise, when the risk score is greater than or equal to the threshold value, determine that the specific address is associated with the specific behavior, generating a visualization identifying the specific address and the risk score for the specific address and indicating that the specific address is associated with the specific behavior, and displaying the visualization via a user interface.

In some instances, determining the risk score for the specific address comprises: identifying addresses in a geographic area shared with the specific address and identifying aspects of the identified addresses and the specific address, wherein the aspects comprise historical information for the identified addresses and the specific address and wherein the aspects are associated with the specific behavior, generating clusters from the identified addresses and the specific address based at least in part on the identified aspects, and generating the risk score for the specific address based on the generated clusters. In some instances, generating the risk score for the specific address further comprises identifying anomalous addresses based on: identifying addresses of the identified addresses and the specific address are not placed in one of the generated clusters, identifying addresses in the generated clusters that have a value for an aspect that varies from the value for the aspect of the other addresses in the generated cluster by a threshold amount, determining whether the specific address is one of the identified anomalous addresses, and assigning the risk score for the specific address based on the determination whether the specific address is one of the identified anomalous addresses.

In some aspects, the risk score assigned for the specific address exceeds the threshold value when the specific address is determined to be one of the identified anomalous addresses or does not exceed the threshold value when the specific address is determined to not be one of the identified anomalous addresses. In some aspects, the specific behavior comprises one or more of fraud or criminal activity.

In some aspects, the method may further comprise obtaining, from the plurality of items, information regarding at least one entity to which the plurality of items is directed to, identifying that the at least one entity is not a first entity with which the specific address is associated in records in a database, and compare a volatility score for the specific address to a threshold volatility value, wherein the volatility score is a measure of a likelihood that the specific address experiences turnover with respect to associated entities over a period of time. In some other aspects, the method may additionally comprise updating the records in the database to associate the at least one entity with the specific address when the volatility score exceeds the threshold volatility value, delivering the plurality of items to the specific address, generating a visualization identifying the volatility score for the specific address and an indicator that the at least one entity is added to the records in the database, and displaying the visualization via a user interface.

The method may further comprise determining the volatility score for the specific address based on historical information regarding the specific address. In some aspects, determining the volatility score comprises identifying a change of address index for the specific address, the change of address index comprises a comparison of change of address requests received for the specific address over two disparate time periods and provides a recency of turnover for the specific address. In some aspects, the method further comprises applying a machine learning model to identify attributes of the historical information most associated with the change of address index, wherein the identified attributes, as identified from the historical information, correlate to aspects of the specific address that are commonly associated with high turnover of entities associated with the specific address. Additionally, applying the machine learning model results in classifying the specific address in one of a plurality of classes each corresponding to a different level of volatility.

The method may further comprise identifying approximately when the first entity stopped receiving items at the specific address, identifying that the first entity started receiving items at a new address within a threshold period of when the first entity stopped receiving items at the specific address, and updating the records in the database to associate the first entity with the new address.

In another aspect, an additional method is described, the method comprising receiving a plurality of items for delivery to an address, obtaining, from the items, information regarding the items and the address, and storing the obtained information in a database. The method further comprises receiving a request for information regarding distributing a targeted item to the address, wherein the request for information includes a request for timing information relating to distributing the targeted item to the address, determining an average historical volume of items for the address over a historical period based on the stored information, and determining, based on the stored information, a reduced volume shift value for the address for a future period having a similar length as the historical period, wherein the reduced volume shift value is a measure of a predicted volume of items the address is expected to receive in the future period that is less than the average historical volume for the address by a threshold amount. The method may also comprise generating a visualization identifying one or more of the reduced volume shift value score for the addresses, the future period, and a distribution date by which the targeted item needs to be provided to ensure distribution to the address within the future period and displaying the visualization via a user interface and displaying the visualization via a user interface.

In some aspects, the threshold amount by which the reduced volume shift value is less than the average historical volume is determined based on an identified statistical variance relative to the average historical volume and wherein the threshold amount is greater than or equal to the identified statistical variance. In some aspects, the average historical volume of items comprises a breakdown of average historical package volume and average historical non-package volume, wherein the average historical non-package volume comprises a breakdown of average historical marketing volume and average historical non-marketing volume, and wherein the reduced volume shift for the address for the future period having the similar length as the historical period is a measure of a predicted volume of marketing items the address is expected to receive in the future period that is less than the average historical marketing volume for the address by the threshold amount. In some aspects, determining the reduced volume shift value comprises applying a temporal machine learning and/or Bayesian regression model to predict whether the address will experience a volume shift at which the targeted item will be distributed to the address.

BRIEF DESCRIPTION OF THE DRAWINGS

These drawings and the associated descriptions herein are provided to illustrate specific embodiments of the invention and are not intended to be limiting.

DETAILED DESCRIPTION

Figure 1:
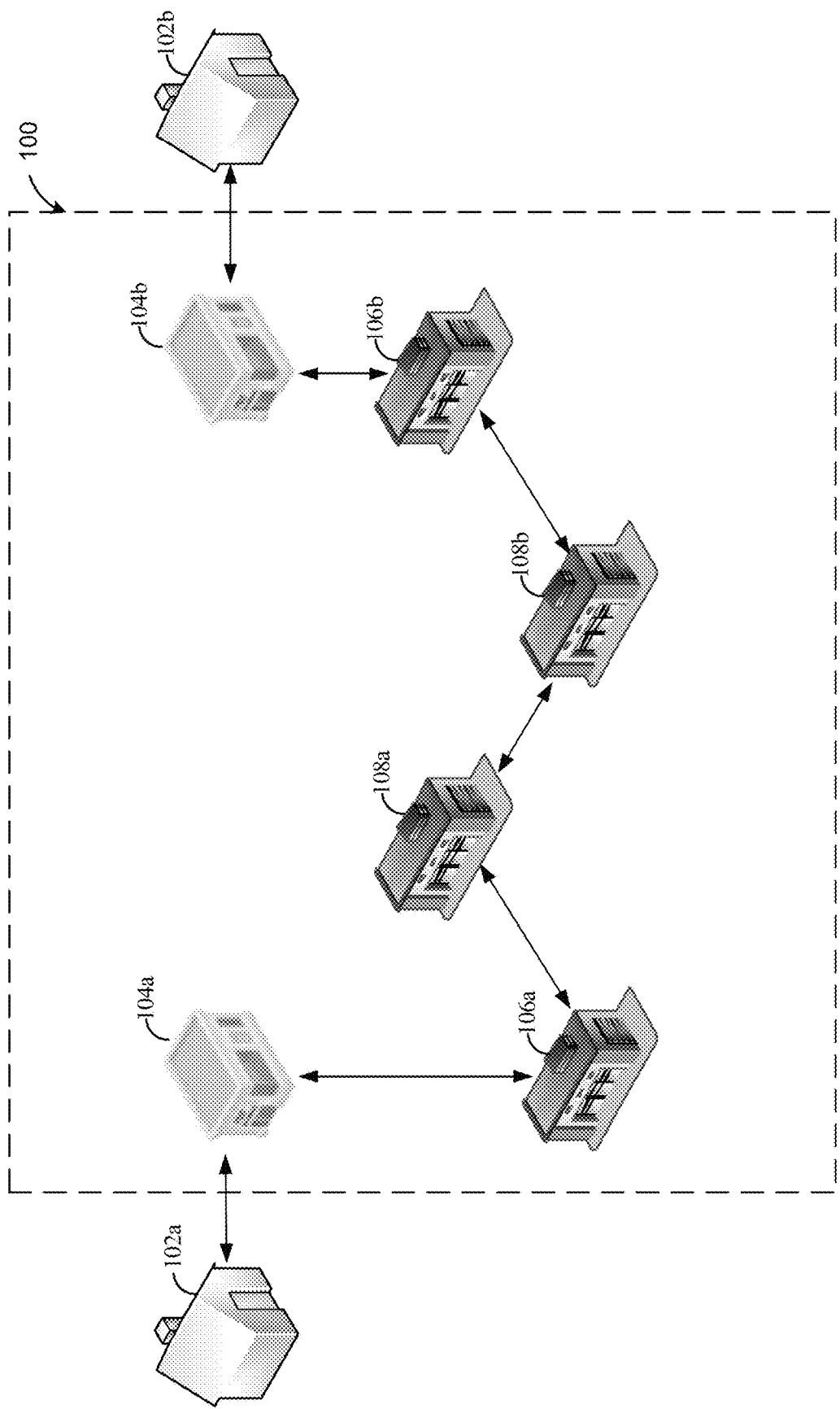
FIG. 1 depicts a diagram of one embodiment of a distribution system or network used to distribute items between shippers and recipients.

The features, aspects and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The United States Postal Service ("USPS") delivers items, such as mail and packages, to physical addresses in the United States on a daily basis, Monday through Saturday. The USPS is tasked with providing secure, reliable, and affordable delivery of items to every address in the United States, U.S. territories, and U.S. military installations worldwide. For example, the USPS delivers more than 480 million items to over 150 million destinations (addresses) every day. In delivering these items to each of these addresses, in the United States and worldwide, the USPS may validate and gather insight on physical addresses with more frequency than other organizations.

The USPS distribution network may comprise multiple levels. For example, the distribution network may comprise regional distribution facilities, hubs, and unit delivery facilities, or any other desired level. For example, the (nationwide) distribution network may comprise one or more regional distribution facilities having a defined coverage area (such as a geographic area, for example a state or a metropolitan area), designated to receive items from intake facilities within the defined coverage area, or from other regional distribution facilities. The intake facility may function to be the location or facility where individual items are, for the first time in the distribution network, identified and entered into the tracking of the distribution network. The regional distribution facility can sort items for delivery to another regional distribution facility, or to a hub level facility within the regional distribution facility's coverage area. A regional distribution facility can have one or more hub level facilities within its defined coverage area. A hub level facility can be affiliated with a few or many unit delivery facilities, and can sort and deliver items to the unit delivery facilities with which it is associated. In some embodiments, the unit delivery facility may also serve as the intake facility. In the case of the USPS, the unit delivery facility may be associated with a ZIP code. The unit delivery facility can receive items from local senders, and from hub level facilities or regional distribution facilities. The unit delivery facility can also sort and stage the items intended for delivery to destinations within the unit delivery facility's coverage area. The delivery destinations may be referred to as addresses or delivery points interchangeably. While processing and delivering distribution items, the corresponding distribution networks and components amass large quantities of data that can be analyzed to identify various data points, trends, or other information. In some embodiments, such analysis of the quantities of data utilizes particular algorithms to identify information about the plurality of delivery points.

Aspects of the present disclosure relate to systems and methods for generating and/or augmenting scores, categories, quantities, or other information regarding delivery points within a distribution network. In some embodiments, the information or scores may be generated for delivery points in a number of categories. The information or scores may be termed, for example, address scores, volatility scores, confidence scores, risk scores, or volume shift scores or values. In some instances, the term address scores can include confidence scores, volatility scores, risk scores, and volume shift values, or can include any combination or sub-combination of these. The address scores may correspond to delivery points or physical addresses, electronic addresses (for example, an e-mail address, a web address, etc.), social media handles, phone numbers, other unique communication identifiers, and so forth. In some embodiments, the systems and methods disclosed herein are configured to receive information associated with one or more delivery points, addresses, handles or the like, from various sources, analyze the received information, and generate a score or shift value for the one or more addresses or handles. In some embodiments, the information may be received from user profiles, customer requests, external databases, and databases of information sourced from items handled in distribution, delivery statistics or data, change of address records, identity of recipients of distribution items, etc. In some embodiments, the address score generated for the delivery point, address, or handle etc., may identify one or more of: (1) a confidence score representing a likelihood that an entity associated with the delivery point, address, or handle etc. in records is accurate, (2) a risk score representing a likelihood that the delivery point, address, or handle etc. is associated with risky behavior, and (3) a volatility score representing a likelihood that entity turnover is high for the associated delivery point, address, or handle etc.

A volume shift value may indicate various information. In some embodiments, the volume shift value generated for a particular delivery point, address, handle, and so forth identifies a volume (for example, quantity) of communications (e.g., mail or other items) that shifts from a first period of time to a second period of time (for example, from a first day to a second day). For example, a first volume shift value for a particular day of the week for a particular mailing address indicates that a volume of mail delivered to the particular mailing address is shifted to another day from the particular day. Alternatively, or additionally, the volume shift value may correspond to a value indicating that the volume of mail delivered on the particular day of the week for the particular mailing address is shifted to (or delivered on) the particular day of the week as opposed to shifted away from the particular day of the week. In some embodiments, the volume shift value indicates the difference in the quantity of items delivered to and/or sent from a delivery point from one time to another. For example, the volume shift value can indicate that from Tuesday to Wednesday in a given week, from a second week to a third week in a given month, or from July to August in a given year the quantity of items delivered to and/or sent from changes by a volume shift value. In some embodiments, the first time period can be a specified day of the week (e.g. Monday), and the volume shift value can be determined based on the volume shift between the specified day of the week in a first week and the specified day in a subsequent week. Thus, the volume shift value may be indicative of a resulting shift in item volume or controlling for a desired shift in item volume.

In some embodiments, the volume shift value indicates a volume of mail received for the particular day, where the volume shift values for each day of the week add up to 100 or a similar value, although other scoring methodologies are explicitly contemplated herein. Thus, the volume shift generally indicates an amount of distribution items, such as mail, parcels, packages, etc., received on a particular day as compared to another day, or as an increase or decrease in the amount of mail received on a day. The volume shift score may be determined or reported as a percentage of the total week or as related to another day of the week. The volume shift value may allow a user to identify what day is best to have mail delivered to an address or person. For example, the user may target delivering mail on a day from which volume is shifted (e.g., a low volume day) or may target delivering mail on a day to which volume is shifted (e.g., a high volume day). In some embodiments, the delivery point scoring and shift volume value determining is performed by one or more components of an item distribution system or network.

The item distribution network or system (referred to herein as "distribution network" and/or "distribution system") may exist for routing items between a sender or sending entity or equipment and a receiver or receiving entity or equipment. In some embodiments, the distribution network comprises a plurality of components, including vehicles, item processing equipment, human resources, etc., that route and move items between entities and/or equipment. Examples of the distribution network are described in more detail below.

As used herein, the term "item" and "distribution item" may refer to discrete articles in a distribution network, such as mail pieces, letters, flats, magazines, periodicals, packages, parcels, goods handled by a warehouse distribution network, baggage in a terminal, such as an airport, etc., and the like. The term item can also refer to trays, containers, conveyances, crates, boxes, bags, and the like. In some embodiments, the term items can also refer to electronic items that are delivered, such as e-mail messages, text messages, chat messages, and the like. As used herein, the term delivery resource, may refer to an individual assigned to a route who delivers the items to each destination, or a carrier. The term "delivery resource" may also refer to other distribution network resources, such as trucks, trains, planes, automated handling and/or delivery systems, and other components of the distribution network. The present disclosure also relates to systems and methods to analyze items sent from or received in a geographic area to identify potential information regarding the item that may provide additional revenue streams for the distribution network.

Additionally, as used herein, the term "resident" may refer to any individual or entity that resides, works, visits, or is associated with a physical or electronic address. For example, as used herein, a person at his or her office is a resident, as is a student or teacher at a school. As used herein, a resident can be an entity capable of sending items from an address and receiving items at an address. A resident may have an e-mail address, a phone number, or another electronic identifier. Additionally, the term "residence" may refer to any building or structure having an assigned physical address or geographical location, such as a house, an office building, an apartment, a factory, a school, etc. Alternatively, or additionally, the term residence may refer to any electronic device having a unique identifier or unique electronic address, such as a phone or subscriber identity module (SIM) card. As used herein, a residence can be any location or device capable of being a destination for items within the distribution network or being a return address for items in the distribution network.

For example, an distribution network (distribution network) such as the USPS, may deliver items (for example, mail), such as letters, flats, etc., according to static routes, and may deliver parcels, packages, and bulky items according to dynamic routes. Alternatively, an example distribution network may be Gmail (delivery electronic messages, such as e-mail messages and/or text messages) or other electronic or digital messaging services. The USPS will be used in the present disclosure to describe exemplary embodiments, but the present disclosure is not limited thereto. When referencing generically to any of the services listed above or any distribution network in addition to those listed above, the phrase "distribution network" will be used to indicate such generalities.

In some embodiments, the delivery system may delivery and/or pickup items over a large geographic area that is divided into one or more delivery routes.

FIG. 1 depicts a diagram of one embodiment of a distribution network 100 used to distribute physical items between shippers 102a and recipients 102b. The distribution network 100 may be employed by a distribution network (for example, the USPS) to distribute items received and to be delivered across a geographic area. The distribution network 100 shows various distribution points or facilities. In some embodiments, the distribution network 100 may include more or fewer distribution points or facilities than shown in distribution network 100. For example, the distribution network 100 includes delivery units 104a and 104b (e.g., post offices or drop-off locations). The distribution network 100 may also include semi-regional facilities 106a and 106b (e.g., sectional center facilities) and regional facilities 108a and 108b (e.g., network distribution centers or distribution hubs).

The delivery units 104a and 104b may correspond to a facility that receives, sorts, and delivers items destined to recipients within a given geographic area. In the case of the USPS, the delivery units 104a and 104b may be associated with a region covered by a ZIP Code™ (a trademark of the USPS). In this role, the delivery units 104a and 104b may receive items from the semi-regional facility 106a that serves it. These items received from the semi-regional facilities 106a and 106b may be delivered by the delivery units 104a and 104b (e.g., via a mail carrier route, etc.) to the appropriate destination within its covered geographic area. Accordingly, the delivery units 104a and 104b may also sort and stage the items intended for delivery to destinations/recipients within the delivery unit's coverage area.

The delivery units 104a and 104b may also serve to receive and enter items into the distribution network 100. When serving as an intake facility, items that are received and entered into the distribution network 100 may be sent to the semi-regional facilities 106a and 106b. In some embodiments, the delivery units 104a and 104b may receive items from local shippers, from semi-regional facilities 106a and 106b, or regional facilities 108a and 108b. While the delivery unit 104a is shown as the intake facility, any of the semi-regional and regional facilities 106a and 106b and 108a and 108b, respectively, or other facilities not shown, may serve as the intake facility.

The semi-regional facilities 106a and 106b may receive and distribute items between multiple delivery units 104a and 104b and the associated regional facilities 108a and 108b. In the case of the USPS, the semi-regional facilities 106a and 106b may each be associated with a geographic region covered by the first three numbers of a ZIP code. The semi-regional facility 106a may serve as a processing and distribution center for the respective multiple delivery units 104a and 104b within its respective geographic areas. In some embodiments, the semi-regional facility 106a may receive items from the regional facility 108a for distribution to its respective delivery unit 104a. In some embodiments, the semi-regional facility 106a may receive items from its delivery unit 104a, for distribution to other delivery units 104b or the regional facility 108a.

The regional facilities 108a and 108b may receive and distribute items between multiple semi-regional facilities 106a and 106b and other regional facilities. In the case of the USPS, the regional facility 108a may be associated with a region covered by a state or a group of states, etc. The regional facilities 108a and 108b may serve as processing and distribution centers for the respective multiple semi-regional facilities 106a and 106b within their respective geographic areas. In some embodiments, the regional facility 108a may receive items from the semi-regional facility 106a for distribution another semi-regional facility 106b that the regional facility 108a serves. In some embodiments, the regional facility 108a may receive items from its semi-regional facilities 106a and 106b for distribution to other regional facilities, e.g., the regional facility 108b.

When the item enters the distribution network 100 at the intake facility (e.g., regardless of delivery unit 104a, semi-regional facility 106a, and regional facility 108a), the item may be tracked through all sortation and distribution steps through which the item may pass. In some embodiments, such tracking may be individual to the item or be aggregate for volumes of items. The tracking may occur until the item is delivered to its destined recipient or until the item leaves a delivery unit 104b for delivery to its destined recipient.

In some embodiments, the distribution network 100, as shown, may be a national distribution network that comprises multiple regional facilities 108a and 108b, multiple semi-regional facilities 106a and 106b, and multiple delivery units 104a and 104b, each having a defined coverage area, such as a geographic area and designated to receive and/or delivery items to/from recipients and senders in the geographic area.

As described herein, the distribution network 100 employed may comprise numerous pieces of equipment located in various facilities and at each level within the distribution network 100 (described and not described) that may scan identifiers on the items, take images of the items, interpret delivery point information from the scans or images of the items, automatically sort and route items according to the delivery point information indicated on the items, physical characteristics of the items, and/or postage characteristics. For example, these pieces of equipment may identify delivery point information that is printed on the item and reference stored information associated with the delivery point information to assist in the sorting and routing of the item.

Alternatively, or additionally, these pieces of equipment may identify recipient delivery point information and sort and route the item based on the identified recipient delivery point information. In some embodiments, different items being routed between the same locations may be routed differently based on a type of the item, postage of the item, size of the item, etc. For example, a first letter shipped from San Diego, CA, to Washington, D.C., with first class postage may be routed differently than a large package shipped between the two locations. Similarly, a second letter shipped with next day postage may be routed differently than the first letter shipped with first class postage. The variety of potential routes for different types of items or different postage services indicates the benefit of distributing a system throughout the distribution network, for example in multiple intake and unit delivery facilities, to maximize the amount of information gathered by the system to associate with residences and delivery points.

Overview of Data Analysis

In some embodiments, the distribution network 100 has access to extensive address and delivery data from handling and delivering the millions of distribution items to the millions of addresses each day. In some embodiments, one or more components of the distribution network 100 analyzes this data to provide near real-time and/or real-time analytics scores and values and data validation for each address associated with one or more items (for example, to which items are delivered and/or from which items are received) and/or for a particular time period of interest. The score or value may measure and/or represent various attributes of the associated delivery point or address. In some embodiments, the attributes include one or more of a confidence score, a risk score, a volatility score, and a volume shift value for each individual address about which the distribution network 100 stores information or data.

Address scoring and volume shift evaluation promotes detection of residence and business lifecycle patterns, as both an external service and enterprise capability. Augmented insights from an artificial intelligence (AI) engine may promote expanded capabilities in management and identification of factors constituting a large address population relative to three distinct address classification types (Confidence, Risk, and Volatility) and a volume shift value. The address scoring and/or volume shift value offering may improve both customer and mailer experiences as well as augment specific investigative processes.

Data for the address scoring engine may be sourced from various channels and production systems, including systems which store delivery point data and an associated recipient, item tracking databases, item processing equipment including processing equipment in a facility and mobile computing devices, vehicle tracking databases, change of address information, and the like. Generating address scores and/or volume shift values can provide a competitive advantage relative to commercial address/identity service providers, and can leverage the extensive data gathered by the distribution network for additional opportunities to improve operational efficiency, for third party data consumers, etc. Several organizational domains can advantageously use the address scoring and/or volume shift value outputs for purposes of improving their businesses and/or communications with existing and prospective or potential customers or consumers. This service may be predicated on the development of an address scoring and/or volume shift product comprised of a suite of Machine Learning models as a comprehensive AI enabled engine. As an example, confidence, risk, and volatility scores can be generated using a suite of machine learning techniques and the wealth of data and delivery information available to the distribution network. Similarly, volume shift values can be generated using similar machine learning techniques and the wealth of data and delivery information available to the distribution network.

The address scoring engine seeks to provide robust insight into key spatial and business domain areas regarding address related data associated with a particular geographic area (i.e., area code, civil divisions, political boundaries, states, municipalities, ZIP, ZIP+4, ZIP+4+2, etc.). The distribution network 100 may utilize the address scoring engine to determine real-time confidence and risk scores about specific addresses (or similar communication points).

The confidence score represents a likelihood that a specific entity (for example, person or business) is associated with a particular address to which items are delivered or from which items is received. For example, the confidence score represents or provides a measure regarding a likelihood that a particular person or business is currently located at a particular address. The confidence score may allow the distribution network 100 to match specific names with specific addresses to enable identification verification and enhance transactional and advertisement mailing events. For example, if an association between a resident named John Adam and an address of 123 Main Street in San Diego, CA has a confidence score of >90 (out of 100), then the distribution network 100 may be highly confident that John Adams lives or works at 123 Main Street. Thus, when confirming John Adam's identity, evidence that John Adam's lives at 123 Main Street (for example, a piece of mail received at that address or a document showing the name and address) may be deemed sufficient to verify John Adam's identity. The confidence score can be used in conjunction with of by many entities who wish to perform identity proofing of individuals, businesses, etc. With respect to the transactional events, financial services companies and entities may use the confidence score to determine a likelihood that a particular person or business is conducting a transaction at a particular address. For example, when the confidence score is above a threshold value, the companies may use the confidence score to confirm that the particular person is participating in or involved with a transaction at the address. Advertisement and other mailing events could be enhanced by increasing likelihood that a particular consumer is a resident at the particular address or can otherwise be determined to receive mail (including advertisements) at the particular address. The identity of the particular consumer can be kept anonymous from the sender of a mailing, but the sender can be assured that an item will be sent to a known consumer.

Alternatively, or additionally, if the distribution network 100 is confident (confidence score of >80 out of 100, for example) that John Adam lives at 123 Main Street, then the distribution network 100 may enable particular items to be delivered to John Adam at 123 Main Street, including target advertisements and/or transactional items. In some embodiments, the distribution network 100 may determine different thresholds of confidence scores for different purposes. For example, identify verification can be used for a delivery point or individual having a confidence score of <90 (out of 100), while enabling delivery of targeted advertisements can occur for a delivery point or recipient having a confidence score of <50 (out of 100), and enabling transactional items can use a confidence score of <75 (out of 100). In some embodiments, the distribution network 100 may generate the confidence score that calculates an individual's or a delivery point's package volume relative to a total package volume within a particular delivery area (for example, a ZIP11 delivery point).

The risk score may represent a likelihood that a specific address is associated with risky or suspicious behavior. Such risky or suspicious behavior may include risky or suspicious mailing behavior (for example, sending or receiving items with a plurality of entity names, and so forth) or risky or suspicious items (for example, sending or receiving items that are counterfeit, illicit, and so forth), a fraudulent delivery point, for example, which receives certain items but does not receive other types of items. For example, a delivery point that receives credit card offers but does not receive a utility bill may be more likely to be a fraudulent address, or may have a higher likelihood of being associated with risky behavior.

The risk score may be used in identity verification processes. For example, if an entity, such as a bank or government entity wants to confirm an identity, which includes a delivery point, such as an address, the risk score of the delivery point associated with the delivery point can be used as a factor in identity determination. If the delivery point has a high risk score, the verification entity can determine that the identity should not be confirmed.

The risk score may allow the distribution network 100 to identify addresses where there may be victims or perpetrators of crime and fraud. For example, the risk score may allow the distribution network 100 to flag risky or suspicious activity associated with an address, regardless of specific occupants of the address. The risk score may enable the distribution network 100 to provide key investigative and enforcement insights to internal and external groups and/or parties. For example, if an address 123 Main Street in San Diego, CA has a risk score of 90 (out of 100), then the distribution network 100 determines that the address 123 Main Street is likely associated with risky or suspicious behavior. In some embodiments, the distribution network 100 identifies a type or specifics of the risky or suspicious behavior (for example, fraud, drugs, and so forth) for communication to the internal and/or external groups (for example, law enforcement, credit agencies, victims, and so forth). In some embodiments, the distribution network 100 may determine different thresholds of risk scores for different purposes. For example, communication regarding fraud activity uses a risk score of <80 (out of 100) while enabling communication regarding illicit items uses a risk score of <70 (out of 100) and so forth. In some embodiments, the distribution network 100 may generate the risk score by applying hierarchical clustering to identify and/or index anomalous behaviors within a particular delivery area (for example, the ZIP11 area) based on attributes from one or more data sources within the distribution network, which is used to identify or flag risky addresses. Risk scores may be determined or analyzed for separate categories. The parameters for one type of risk score can be different than another type of risk score. For example, when the risk is being determined for identify verification, a first set of parameters can be used. If, however, the risk score is used to identify criminal behavior, a different set of parameters can be used. The risk score analysis can be run separately to produce an identity verification risk score, a criminal/fraudulent activity risk score, and other desired risk scores.

The volatility score may represent a likelihood that a specific address will experience occupant turnover. For example, the volatility score may indicate a likelihood that an entity associated with an address will change addresses within a threshold period of time, such as 3-months, 6-months, 9-months, 12-months, and so forth. The volatility score may enable the distribution network 100 to provide insight to customers regarding benefits or likelihood of reaching a particular audience by understanding frequency of entity turnover. For example, if an address of 123 Main Street in San Diego, CA has a volatility score of 100 (out of 100), then the distribution network 100 may be highly confident that entity turnover (within the threshold time period) at 123 Main Street is high. For example, the score of 100 indicates that the distribution network 100 is confident that the entity at 123 Main Street has changed in the last X months, where X is the threshold time period. Thus, the distribution network 100 is able to identity to potential advertisers what entities have likely changed and likely do not live at previous addresses based on the volatility score for that address. Additionally, such information may be useful for item delivery operations. For example, an address having a high volatility score may have shorter address change durations when an entity moves to the address having the high volatility score. In some embodiments, the distribution network 100 may use the volatility score to predict an address' volatility class based on, for example, historical address information for the address (for example, quantity, frequency, etc., of change-of-address submissions at that address).

Some commercial entities may desire to target particular distribution items, services, or other offers or items to addresses that have a high volatility, for example, moving companies, cable television and internet companies, home improvement stores, and the like. In some embodiments, some commercial entities may desire to target delivery points or addresses that have a low volatility score, such as financial planners, insurance companies, and the like.

The volume shift value may represent various information, such as a distribution of items over a given period of time. For example, a residence may receive a quantity X of items on a Monday, a quantity Y on Tuesday, a quantity Z on Wednesday, etc. A volume shift value can evaluate the quantity of items over a time period and identify a period, time, or day where a predicted quantity of items for a given delivery point will be low, will be high, etc. In another example, the volume shift value can indicate a likelihood that a threshold amount or volume of items having a specific address as a destination address will be shifted by a particular period of time, or how much of the volume will be shifted to or from a particular day or other time period, or how much volume of mail is expected for a particular day with respect to one or more other days. For example, the volume shift may indicate a likelihood that an address will experience a shift in volume (either volume being shipped from the address or received at the address) within a threshold period of time or to/from a particular day, and so forth. The volume shift value may enable the distribution network 100 to provide insight to customers (for example, mailing companies, receiving entities, etc.) regarding when particular addresses generally receive mail or when mail is shifted between days or dates. Such information may be useful for the customers to coordinate when to mail items (for example, advertisements) so that they arrive on days with particular volumes of mail (either high or low volumes, for example). For example, if an address of 123 Main Street in San Diego, CA has a volume shift value of 100 (out of 100) for a particular day of the week, then the distribution network 100 may be highly confident that the volume of items to be received on a first day will be received instead on a second day. In some embodiments, the volume shift value of 100 may indicate that 100% of a weekly volume of items for the address will be received on the first day of the week.

In some embodiments, the volume shift scores can indicate which days of the week are likely to receive more items and which are likely to receive fewer items. In some embodiments, the volume shift scores can indicate which weeks or months for particular delivery points will receive more or fewer items, or can indicate when items should be or should not be sent to particular delivery points in order to maximize effect or improve visibility. In some embodiments, the volume shift scores or values can further be associated with portions of the distribution network 100. For example, a particular sender may wish to have an item delivered to a particular delivery point on a day where there are few or no other pieces of advertising mail. The volume shift value can predict a day on which the advertising mail is likely to be low. The sender can use the information from the distribution network 100 to identify the day and place the item should be inducted in order for the delivery to occur on the day with a low advertising mail volume. In some embodiments, the volume shift value can be determined overall for the delivery point, and/or can be determined for specific types of items, such as mail class, mail type, sender identity, etc. For example, a bank may wish to have an item delivered to a delivery point on a day where it is likely no other credit card offers will be sent, or a political party or candidate may wish to deliver an item on the same day as an opponent's mailer, or on a day where there is no other election mail.

The distribution network 100 may utilize the scores, volume shift values, and other attributes to inform and add value to its own operations, products, and services. Various benefits and improvements over existing system may exist for the distribution network 100. For example, the systems and methods described herein for the address scoring may have an increased quantity of data points as compared to third parties due to the quantities of items handled by the distribution network 100 and the daily service to many physical addresses and the quantity of customer touchpoints (for example, an average of 2.24 customer touchpoints per month). For example, analysis of such information results in new information that allows the distribution network 100 to reduce reliance on third-party information and/or knowledge-based authenticators (KBAs). Additionally, or alternatively, the analysis of available information may provide improved data for combating and/or avoiding mail-related crime and abuse. Furthermore, such analysis may lead to the streamlining or improved efficiencies of the distribution network 100 and reduce item re-ingestion occurrences or generation of new sources of revenue for the distribution network 100.

Furthermore, the distribution network 100 may use the scores, volume shift values, and other attributes to improve address verification, in-person proofing, informed address systems, targeted mailings, and various other products. For example, address verification may be improved by enabling the distribution network 100 to aggregate sufficient data to enable the address scores to represent or be used in identity verification without needing to access or share data with one or more third parties. The in-person proofing may be improved when the distribution network 100 confirming identification of low confidence addresses, phone numbers, handles, etc., by directing entities associated with those low confidence addresses and so forth to in-person proofing methods earlier in an identity proofing process. While physical or street addresses may be described in the examples herein, the methods, systems, apparatus, and corresponding description may instead apply to e-mail addresses, phone numbers, social media handles, geographic coordinates, names, other features, and the like. The address scores may improve and/or enable improved use of informed addressing systems (for example, systems that enable item delivery through alternate methods of address, where an item may be delivered using a phone number, e-mail address, or other unique identifier as opposed to only a physical address. The address scores can be used to track confidence in the associations within the informed address system and/or to indicate when an entity may need to update their informed address registration or confirm/authenticate relationships and/or associations. The targeted mailing system may be improved by using the address scores to track confidence that entities are still associated with particular addresses to provide confidence metrics to marketing mailers that items are reaching intended recipients.

In addition to the improvement of the distribution network offered by the analysis, the analysis of the address and delivery data may be used in combatting criminal and fraudulent activity through or with external groups. For example, the analysis of address and delivery data could identify potential identify fraud when a person at a single address receives mail for multiple entities that also receive substantial amounts of mail at other addresses. Another potential use case of address and delivery data analysis is verifying of user identities, such that an entity known to receive multiple bills at a given address may be verified by identifying such information. Additionally, the analysis of the data may support administration of benefits to legitimate recipients while reducing fraud and abuse by others. Furthermore, the analysis of the data can associate addresses with other user or entity information, for example e-mail addresses, phone numbers, social media handles, and so forth.

In some embodiments, the data analytics described herein can enhance value of marketing mail by helping organizations (for example, third party mailers) more confidently reach their target audiences in an era of digital saturation. The data analytics can provide greater integrity and reliability in address-based data to help organizations reduce instances of fraud. Additionally, the data analytics can filter low-confidence users away from KBAs, while developing a valuable data input for external ID verification providers. The analytics and corresponding processing described herein enables the distribution network 100 to unlock the value of its data assets by applying analytics to generate address-based insight. Additionally, the distribution network 100 can bring a new product to market that benefits internal users, adds value to existing products, and serves external buyers alike. Furthermore, using such data analytics and the like, the distribution system 100 can harness advanced analytics to more intelligently combat mail-related crime and fraud. The systems and methods described herein can provide an analytics-based product that harnesses distribution network 100 data (for example, unique address and delivery data) to provide real-time or near real-time address-based scores (for example, the score types including confidence, risk, and volatility scores) for specific addresses. Address scoring can help the distribution network 100 enhance the value of existing products and services, reduce reliance on current ID verification services, combat mail-related crime, and grow revenue. Additionally, the address scoring can be built as both a standalone tool/portal and an integrated data feed/API for integration to existing data environments.

Computing System

Figure 2A:
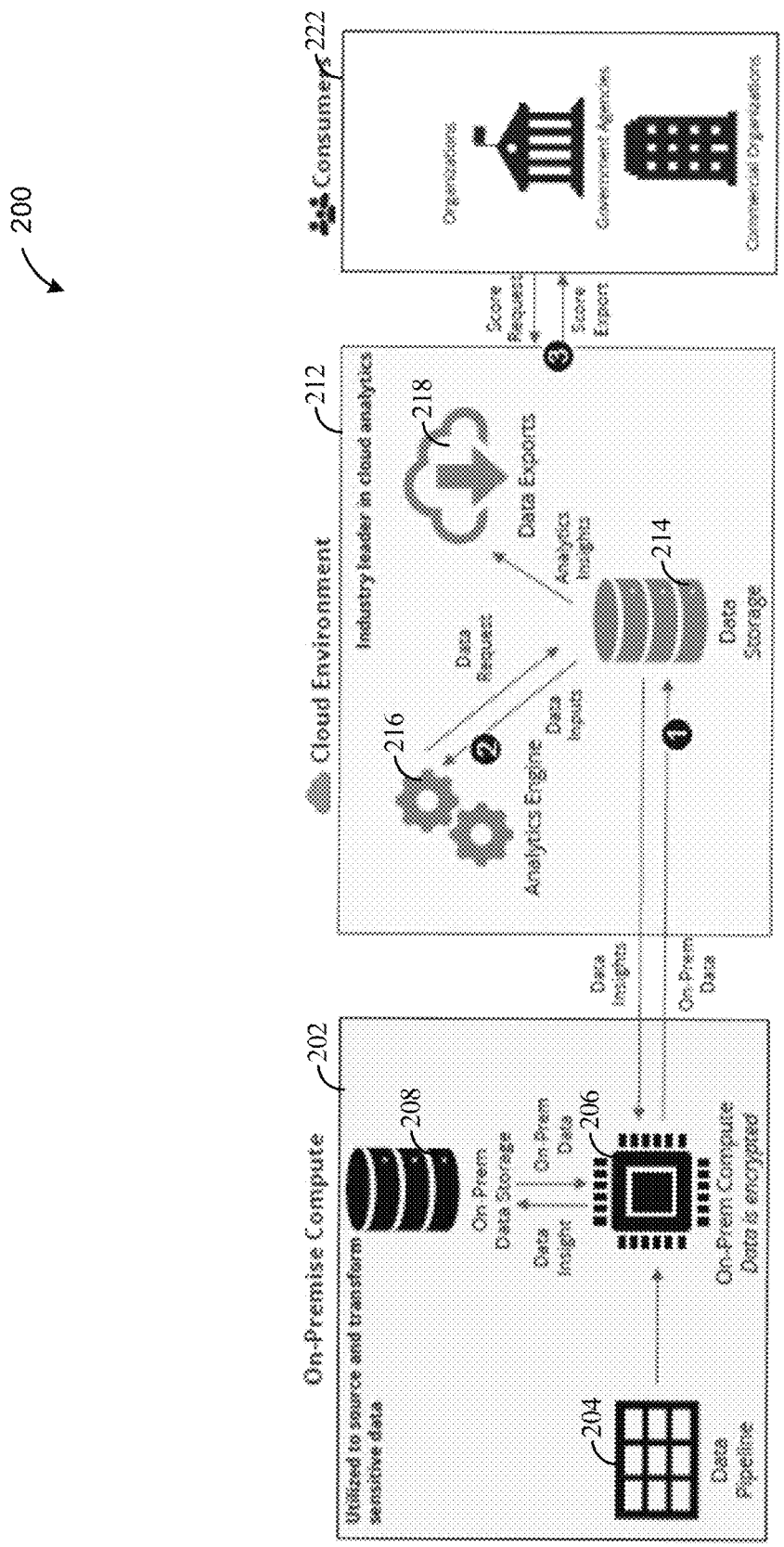
FIG. 2A illustrates one potential architecture for a computing system that can be utilized by the distribution network of FIG. 1 to implement the methods and processes of address scoring to identify address scoring information.

FIG. 2A illustrates one potential architecture for a computing system 200 that can be utilized by the distribution network 100 of FIG. 1 to identify address scoring information. The computing system 200 may comprise a hybrid-cloud approach because a fully on-premises system may face constraints and limitations. The computing system 200 may comprise an on-premises portion 202, a cloud environment portion 212, and a consumers portion 222. The on-premises portion 202 may comprise local data, a data pipeline 204 that provides data to a local, on-premises processor 206, which encrypts data received, for example, from sources of the data pipeline 204. A local or on-premises component can be in the local facility, or can be on a remote server which is connected to the component, but may not necessarily be part of a cloud computing architecture. The sources of the data pipeline 204 may comprise the various data sources of the distribution network 110 (for example, any of the data inputs 310 of FIG. 3). The on-premises portion 202 also includes an on-premises data storage 208 that provides on-premises data to the on-premises processor 206 and receives data insights generated by the on-premises processor 206. The data insights may correspond to the results of analysis of the input data (i.e., from the data pipeline 204 and/or other components of the system 200) from the on-premises processor 206. The on-premises processor 206 may provide the on-premises data (for example, as received from the on-premises data storage 208) to the cloud portion 212 and receive data insights from the cloud portion 212. In some instances, the data insights received from the cloud portion 212 by the on-premises portion 202 are the data insights stored in the on-premises data storage 208. The on-premises data may comprise data ingested into the cloud portion 212 may be used for pipeline processing and enabling clod based functions.

The cloud portion 212 comprises a data storage 214 that receives the on-premises data from the on-premises portion 202. The data store 214 may feed the on-premises data to an analytics engine 216. The analytics engine 216 may use the on-premises data to create models and predict address score information (e.g., the confidence, risk, volatility, and volume shift information and/or scores). The analytics engine 216 may store the generated models and/or scores/values in the data storage 214, which may provide the information generated by the analytics engine 216 to a data exports system 218. The data exports system 218 may pass the generated scores and/or models to the consumers (for example, via direct connections, internal/external API connections, and so forth) to satisfy consumer stakeholder requirements. The consumer portion 222 may comprise various companies, governmental agents, and so forth. Thus, the scores may be provided to any of the distribution network 100 (for example, one or more components of the distribution network 100), a government entity or agency, a commercial agency or entity, and the like. In some embodiments, the consumer portion 222 may provide a score request to the cloud portion 212. The various processing of the system 200 may occur in response to these score requests. Further details of the various portions of the system 200 used to generate the scores and values as described below with reference to FIG. 2B.

Figure 2B:
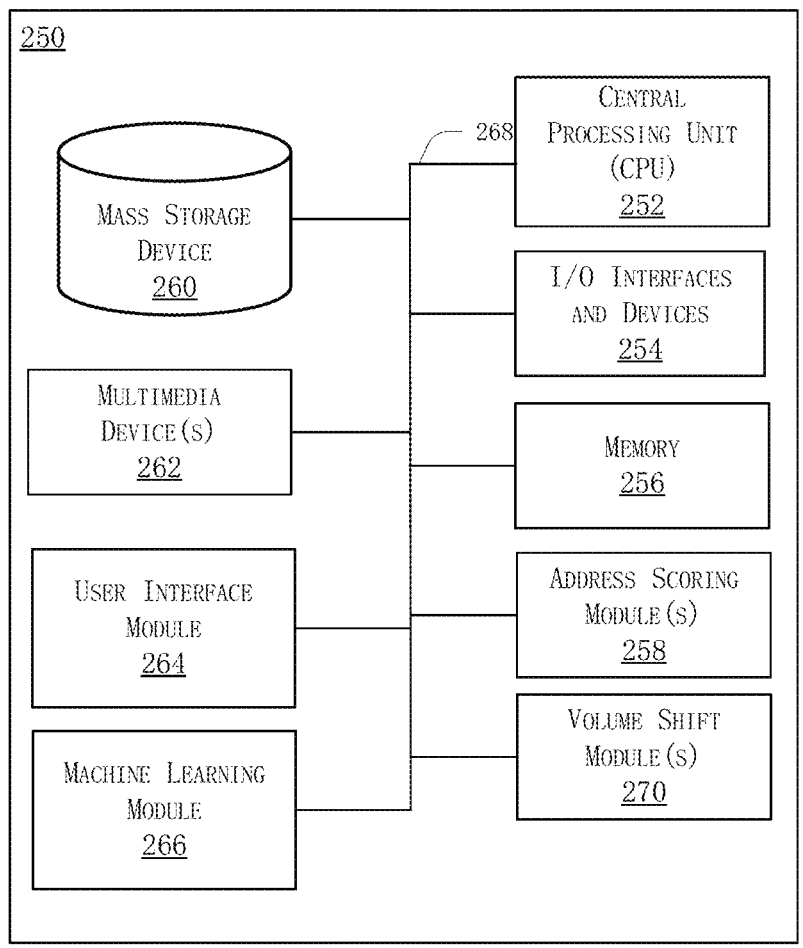
FIG. 2B is a block diagram corresponding to a module or subsystem, which may be implemented as a hardware and/or software component, of an example embodiment of the distribution network of FIG. 1 and/or of the system of FIG. 2A.

FIG. 2B is a block diagram corresponding to a module or subsystem 250, which may be implemented as a hardware and/or software component, of an example embodiment of the distribution network 100 of FIG. 1 and/or of the system 200 of FIG. 2A. As shown in FIG. 2B, the distribution network 100 and/or the system 200 (or a component thereof) includes or utilizes the module or subsystem 250. The module or subsystem 250 may be referred to herein as an address scoring system 250. In some embodiments, any component or entity of the distribution network 100 may comprise the address scoring system 250. In some embodiments, the distribution network 100 or the system 200 may comprise a single component or system embodied by the address scoring system 250. In some embodiments, the address scoring system 250 (and any of the modules of the distribution network 100) may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2B, one or more components of the distribution network are modules, instances, and/or software that operate on the address scoring system 250. These components may be used to implement systems and methods described herein.

In some embodiments, the various modules described herein may be implemented by either hardware or software. In an embodiment, various software modules included in the distribution network 100 may be stored on a component of the distribution network 100 itself, or on computer readable storage media or other component separate from the distribution network 100 and in communication with the distribution network 100 via a network or other appropriate means.

The address scoring system 250 (or any components or modules of the delivery system 100) may comprise, for example, a computer that is IBM, Macintosh, or Linux/Unix compatible or a server or workstation. In some embodiments, the address scoring system 250 comprises a smart phone, a personal digital assistant, a kiosk, or a media player.

In some embodiments, the address scoring system 250 may comprise more than one of these devices. In some embodiments, the address scoring system 250 includes one or more central processing units ("CPUs" or processors) 252, I/O interfaces and devices 254, memory 256, a scoring module 258, a mass storage device 260, multimedia devices 262, the user interface module 264, a machine learning module 266, a volume shift module 270, and a bus 268.

The CPU 252 may control operation of the address scoring system 250. The CPU 252 may also be referred to as a processor. The processor 252 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The I/O interface 254 comprises a keypad, a microphone, a touchpad, a speaker, and/or a display, or any other commonly available input/output (I/O) devices and interfaces. The I/O interface 254 may include any element or component that conveys information to a consumer or user of address scoring system 250 or the delivery system 100 and/or receives input from the consumer or user. In one embodiment, the I/O interface 254 includes one or more display devices, such as a monitor, that allows the visual presentation of data to the consumer. More particularly, the display device provides for the presentation of GUIs, application software data, websites, web apps, and multimedia presentations, for example.

In some embodiments, the I/O interface 254 may provide a communication interface to various external devices. For example, address scoring system 250 is electronically coupled to the network, which comprises one or more of a LAN, WAN, and/or the Internet. Accordingly, the I/O interface 254 includes an interface allowing for communication with the network, for example, via a wired communication port, a wireless communication port, or combination thereof. The network may allow various computing devices and/or other electronic devices to communicate with each other via wired or wireless communication links.

The memory 256, which includes one or both of read-only memory (ROM) and random access memory (RAM), may provide instructions and data to the processor 252. For example, inputs received by one or more components of the address scoring system 250 may be stored in the memory 256. A portion of the memory 256 may also include non-volatile random access memory (NVRAM). The processor 252 typically performs logical and arithmetic operations based on program instructions stored within the memory 256. The instructions in the memory 256 may be executable to implement the methods described herein. In some embodiments, the memory 256 may be configured as a database and may store information that is received via the user interface module 264 or the I/O interfaces and devices 254.

The address scoring system 250 may also include the mass storage device 260 for storing software or information (for example, data aggregated from one or more sources, records of customer opt-in/out, etc.). Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. The mass storage device 260 may comprise a hard drive, diskette, solid state drive, or optical media storage device. In some embodiment, the mass storage device 260 may comprise data aggregated and fused from operation and/or non-operational sources into a unified data model, including attributes from one or more networked or connected systems of the distribution network, for example, the address management system (AMS), national change of address (NCOA) system, informed visibility (IV), and product tracking and reporting (PTR). The AMS may provide information regarding valid addresses and classifiers about each residence and corresponding delivery. The PTS may record addresses and names on package labels, item labels, and so forth and calculates aggregate counts of packages (and/or items) delivered. The NCOA may record and count change of address requests/submissions, including new and old location information. The IV may record information regarding individual items and tracks counts by type the location area.

The address scoring system 250 also includes the scoring module(s) 258. In some embodiments, the scoring modules 258 may also be stored in the mass storage device 260 as executable software code that is executed by the processor 252. In the embodiment shown in FIG. 2B, the address scoring system 250 may be configured to execute the scoring modules 258 to perform the various methods and/or processes as described herein. In some embodiments, the address and/or volume shift scoring described herein is performed by or comprises a confidence score engine that is part of the scoring module 258. In some embodiments, the confidence score engine develops a preliminary methodology for scoring identities of a household using only PTR addressee data. Additionally, or alternatively, the address scoring is further performed by a risk score engine, a volatility score engine, and/or a volume shift engine that is part of the scoring module 258. The risk, volatility, confidence, and/or volume shift score engines may utilize machine learning techniques that enable analysis of a wide array of ingest data attributes.

The address scoring system 250 also includes the volume shift module(s) 270 as a separate component or module from the scoring module 258. However, in some embodiments, the volume shift modules 270 is implemented as part of the scoring modules 258 and/or may also be stored in the mass storage device 260 as executable software code that is executed by the processor 252. In the embodiment shown in FIG. 2B, the address scoring system 250 may be configured to execute the volume shift modules 270 to perform the various methods and/or processes as described herein. In some embodiments, the volume shift value determination and calculation described herein is performed by or comprises a volume shift engine that is part of the volume shift module 270. In some embodiments, the volume shift engine develops a preliminary methodology for generating volume shift values for addresses using data from one or more the AMS and/or one or more other networked or connected systems of the distribution network 100 or system 200. Additionally, or alternatively, the volume shift determination is further performed by the volume shift engine that is part of the scoring module 258. The volume shift engine may utilize machine learning techniques that enable analysis of a wide array of ingest data attributes.

The address scoring system 250 also includes the user interface module 264. In some embodiments, the user interface module 264 may also be stored in the mass storage device 260 as executable software code that is executed by the processor 252. In the embodiment shown in FIG. 2B, the address scoring system 250 may be configured to execute the user interface module 264 to perform the various methods and/or processes as described herein. In some embodiments, the user interface module 264 provides a customer front end that ingests and aggregates outputs from the address scoring engines.

The user interface module 264 may be configured to generate and/or operate user interfaces of various types. In some embodiments, the user interface module 264 constructs pages, applications ("apps") or displays to be displayed in a web browser or computer/mobile application. In some embodiments, the user interface module 264 may provide an application or similar module for download and operation. The pages or displays may, in some embodiments, be specific to a type of device, such as a mobile device or a desktop web browser, to maximize usability for the particular device. In some embodiments, the user interface module 264 may also interact with a client-side application, such as a mobile phone application (an "app"), a standalone desktop application, or user communication accounts (e.g., e-mail, SMS messaging, etc.) and provide data as necessary to display vehicle equity and prequalification determinations. For example, as described herein, the address scoring system 250 may be accessible via a website.

The address scoring system 250 also includes the machine learning module 266. In some embodiments, the machine learning module 266 may also be stored in the mass storage device 260 as executable software code that is executed by the processor 252. In the embodiment shown in FIG. 2B, the address scoring system 250 may be configured to execute the machine learning module 266 to perform the various methods and/or processes as described herein. In some embodiments, the machine learning module 266 may include or utilize one or more machine learning models that are trained using data based on curbside delivery points. In some embodiments, the machine learning module 266 may be retrained as more training data is acquired (for example, via sampled learning or population modeling to maintain or improve accuracy).

In some embodiments, the communications with the distribution network 100 or the address scoring system 250 may be specially formatted to be simultaneously communicated via multiple communications methods and/or formats (e.g., text, e-mail, call, mail, etc.).

The bus 268 may electrically and/or physically connect the components of the address scoring system 250 to enable communication between the components.

Details of the confidence, risk, and volatility scores and the volume shift information are provided below.

Confidence scoring analysis performed by the confidence score engine may employ one or more machine learning models and/or methods. More specifically, the confidence score engine may create a probability-based score that calculates an individual identity's package volume relative to the total package volume at a corresponding delivery point, for example the individual's residential ZIP11 delivery point. The confidence score may be calculated based on the package barcode that a store's recipient and destination delivery point information relative to historical information as analyzed by the one or more machine learning models and/or methods. In some embodiments, the confidence score could be based, at least in part, on various factors, metrics, or inputs. Examples and details of these metrics are provided in Table 1 below:

TABLE 1

| Key Metric | Metric Description | Potential Data Source | Potential Data Attributes | Potential Confidence Score Impact | Potential Degree of Impact to Confidence Score |
|---|---|---|---|---|---|
| Frequency of Package Delivery | Number of parcels delivered to an address in a given timeframe | Package Tracking and Reporting (PTR) | Package addressee name and ZIP11 delivery point for all package delivery entries | Frequent parcel delivery would indicate residence, as packages are generally higher-value items and ordered directly by recipient | High |
| Recency of Package Delivery | Most recent package delivery to a particular person at a particular address | PTR | Most recent package delivery entry for addressees recorded at a ZIP11 delivery point | Package receipt can indicate whether residence for an identity at an address is potentially current | High |
| Informed Delivery Registration | Flag indicating whether customer is enrolled in Informed Delivery | Informed Delivery (ID)/ CustReg | Name, address, and registration date in Informed Delivery customer profile | Monitoring mail delivery for an address via Informed Delivery, which requires name/address verification, could indicate active residence at that address | High |

TABLE 1-continued

| Key Metric | Metric Description | Potential Data Source | Potential Data Attributes | Potential Confidence Score Impact | Potential Degree of Impact to Confidence Score |
|---|---|---|---|---|---|
| Most Recent COA | Identity associated with the most recent change of address date for a particular address field (street address, city, state, or zip) | National Change-of-Address (NCOA) | Date, address and name of resident(s) for a change-of-address entry | If COA was relatively recent, it could be highly indicative of a current occupant | High |
| Hold Mail Requests | Requests to hold mail at an address and identity associated with the request | Operations | Date, address and name of requestor for a Hold Mail entry | A short-term Hold Mail request could increase confidence, as it implies an association between the submitter and the address. Hold Mail requests would lower confidence at the address the hold mail request was made for if the Hold Mail request is over an extended period of time | High |
| Informed Address Registration | IA subscribers confirm the address they would like to be cascaded into other services requiring an address | Informed Address | Name and address in Informed Address customer profile | As customers would be confirming their current address to send to 3rd parties, it is likely a high-confidence contributor | High |
| Frequency of Mail Delivery | Number of letter/flat pieces delivered by a mail carrier to mailbox in a given timeframe | Informed Visibility (IV)/ Optical Character Reader (OCR) Capture | Mail piece delivery counts to an identity and address by mail piece type, postage value of mail pieces received | High frequency of mail delivery to an identity at an address would indicate residence, but marketing mail may be misleading if based on outdated mailing lists | Moderate |
| Recency of Mail Delivery | Most recent mail delivery to a particular person at a particular address | IV/OCR Capture | Most recent mail piece entry for addressees recorded at a ZIP11 delivery point | Recent receipt of mail at an address could indicate active residence for an identity, though marketing mail may be misleading if based on outdated mailing lists | Moderate |
| Years at Address | Number of years an identity is located at this address | ID/PTR/ IV/OCR/ Informed Address (IA)/ Change of Address (COA) | Earliest record across all data sources of a USPS interaction with an identity at an address | An extended history of receiving mail/packages at an address would raise confidence for an identity's association with that address | Moderate |

TABLE 1-continued

| Key Metric | Metric Description | Potential Data Source | Potential Data Attributes | Potential Confidence Score Impact | Potential Degree of Impact to Confidence Score |
|---|---|---|---|---|---|
| Number of Tenants | Number of tenants receiving mail/packages at an address within given timeframe | PTR/IV/ OCR | Mail piece delivery counts to an identity and address by mail piece type, package addressees at a ZIP11 delivery point | A large number of identities receiving mail at an address could decrease the confidence in each's residence at the address | Low |
| Residence Type | AMS residence classification (curbside delivery point, high-rise, office building, etc.) | Address Management System (AMS) | Delivery point code, usage code, BFH code, type code | Residence types with multi-unit set up could have higher occupant turnover | Low |

As introduced in Table 1, the address scoring system 250 of FIG. 2B may utilize, as sources, OCR data, IV data, CustReg data, NCOA data, AMS data, PTR data, and ID data. Such sources may provide information that is used to generate and/or process models and/or received data inputs to identify the confidence, risk, and volatility scores and volume shift values described herein.

Risk scoring analysis performed by the risk score engine may employ one or more machine learning models and/or methods. For example, the risk score engine may apply advanced hierarchical clustering to index and quantify anomalous addresses at the local area based on the attributes from the IV, PTR, AMS, and NCOA data, to identify risky addresses. In some embodiments, the risk score could be based, at least in part, on various factors, metrics, or inputs of the distribution network 100. Examples and details of these metrics are provided below in Table 2:

TABLE 2

| Key Metric | Metric Description | Potential Data Source | Potential Data Attributes | Potential Risk Score Impact | Potential Degree of Impact to Risk Score |
|---|---|---|---|---|---|
| Volume of Package Delivery | Number of parcels delivered to an address in a given timeframe | PTR | Package delivery counts for a ZIP11 delivery point | Uncommonly high package volume could indicate illicit activity, especially in tandem with other metrics (ex. Vacancy flag) | High |
| Most Recent Package Delivery | Most recent package delivery to a particular address | PTR | Most recent package delivery entry recorded at a ZIP11 delivery point | Receipt of package(s) after a COA away or with a vacancy flag could increase risk | High |
| Number of Tenants | Number of tenants receiving mail/packages at an address, within given timeframe (not living at address) | PTR/IV/ OCR | Mail piece delivery counts to an identity and address by mail piece type, package addressees at a ZIP11 delivery point | Anomalously high number of potential residents receiving mail/packages could indicate illicit activity | High |
| COA Entries | COA events that have happened in a particular time period to identify anomalous behavior | NCOA | Number of COA entries for an address within a timeframe, and date of most recent COA entry | COA records could indicate a potentially vacant unit if there is a COA away without a COA to | High |

TABLE 2-continued

| Key Metric | Metric Description | Potential Data Source | Potential Data Attributes | Potential Risk Score Impact | Potential Degree of Impact to Risk Score |
|---|---|---|---|---|---|
| Vacancy Flag | Flag indicating possible vacancy at an address | IV/PTR/NCOA | Most recent COA to an address and most recent COA away from an address | A potentially vacant address (COA away from an address without a corresponding COA to that address) could increase risk | High |
| Risk Data | Records of suspicious addresses or packages* | Internal | Names and/or addresses associated with known suspicious or illegal use of mail system | Tracks suspicious use of the mail system, which would be a verified risk flag | High |
| Type of Item Delivered | Identities of Senders of items, origination of items | Internal, PTR, IV | Origin of items, sender of items | E.g., if an address received a lot of credit card offers, parcels, or other types of items, but does not receive a utility bill, or a tax bill, etc., indicates a fraudulent address | High |
| Volume of Item Delivery | Number of items delivered by a carrier to an address in a given timeframe | IV/OCR | Item delivery counts to an address by item type | Uncommonly high item volume could indicate illicit activity | Moderate |
| Most Recent Item Delivery | Most recent item delivery at a particular address | IV/OCR | Most recent item delivery recorded at a ZIP11 delivery point | Receipt of item after a COA away or with a vacancy flag could increase risk | Moderate |
| Enrolled in Informed Delivery | Flag indicating whether address is registered to an active user in Informed Delivery | ID/CustReg | Address and registration date in Informed Delivery customer profile | Enrollment in Informed Delivery could decrease risk as name/address combinations are verified | Moderate |
| Residence or Business | Residence or business identification | AMS | Delivery point usage code | Anomalous behavior based on classification could raise risk (ex. Residence address shipping lots of packages) | Moderate |
| Census Data | Socioeconomic data at ZIP5 level collected by Census and shared with USPS | Enterprise Data Lake (EDL) | Ex: ZIP5 income, average age, real estate values | Socioeconomic trends may influence a general area's risk | Moderate |
| Rejected Deliveries | Mail pieces or packages marked Undeliverable-as-Addressed or Return to Sender (RTS) | Operations | UAA and RTS counts at an address for both mail pieces and packages | Persistently rejected delivery of mail or packages could indicate items being shipped to an address that don't belong | Moderate |

TABLE 2-continued

| Key Metric | Metric Description | Potential Data Source | Potential Data Attributes | Potential Risk Score Impact | Potential Degree of Impact to Risk Score |
|---|---|---|---|---|---|
| Residence Type | The type of residence classification in AMS (i.e. single family, apartment, condominium, high rise, etc.) | AMS | Delivery point code, usage code, BFH code, type code | Anomalous behavior unexpected at a particular address type could increase risk (ex. High # of tenants at single-family home) | Low |

Volatility scoring analysis performed by the volatility score engine may employ one or more machine learning models and/or methods. For example, the volatility score engine may utilize a random forest trained model to identify address attributes most associated with past changes of address forms and predict and address' volatility class based on the prevalence of historical change of address submissions. In some embodiments, the volatility score could be based, at least in part, on various factors, metrics, or inputs. Examples and details of these metrics are provided below in Table 3:

TABLE 3

| Key Metric | Metric Description | Potential Data Source | Potential Data Attributes | Potential Volatility Score Impact | Potential Degree of Impact to Volatility Score |
|---|---|---|---|---|---|
| Enrolled in Informed Delivery | Flag indicating whether address is registered to an active user in Informed Delivery | ID/CustReg | Address and registration date in Informed Delivery customer profile | If a customer changes their Informed Delivery address, this could indicate a recent or upcoming move | High |
| Age of Address Record | Age of the delivery point | AMS | Date address record was created in AMS | Newer addresses are likely to have occupants moving in, which would increase volatility | High |
| COA Date | COA events that have happened in a particular time period to identify anomalous behavior | NCOA | Number of COA entries for an address within a timeframe, and date of most recent COA entry | Historical COA submissions at an address can be extrapolated to predict when the next COA may occur, which could increase volatility | High |
| Hold Mail Requests | Requests for hold mail made for a particular address | Operations | Date, address and name of requestor for a Hold Mail entry | Submission of a long hold-mail request could indicate intent to vacate an address, which would increase volatility | High |

TABLE 3-continued

| Key Metric | Metric Description | Potential Data Source | Potential Data Attributes | Potential Volatility Score Impact | Potential Degree of Impact to Volatility Score |
|---|---|---|---|---|---|
| Categorization of Area | Type of area/community (i.e. school area, university campus, military base) | AMS | Delivery point BFH code | Certain address types have high turnover, increasing volatility | High |
| Vacancy Flag | Flag indicating possible vacancy at an address | IV/PTR/ NCOA | Most recent COA to an address and most recent COA away from an address | A potentially vacant address could be receiving a new occupant, potentially increasing volatility | High |
| Public Real Estate Listings | Records of an address being listed for sale | Public real estate sources, including brokerage sites, rental sites, etc. | Date address listed, length of listing, status (for sale, under contract, sold) | An address being listed for sale, or under contract, could indicate imminent resident turnover and increase volatility | High |
| Volume of Package Delivery | Number of parcels delivered to an address in a given timeframe | PTR | Package delivery counts for a ZIP11 delivery point | Significant swings in package volume could indicate resident turnover (ex. suddenly start receiving lots of packages could be new occupant) | Moderate |
| Number of Tenants | Number of tenants receiving mail/packages at an address, within given timeframe (not living at address) | PTR/IV/ OCR | Mail piece delivery counts to an identity and address by mail piece type- package addressees at a ZIP11 delivery point | A consistently high number of tenants could increase volatility, as there are more candidates for a move | Moderate |
| Residence Type | The type of residence classification in AMS (i.e. single family, apartment, condominium, high rise, etc.) | AMS | Delivery point code, usage code, BFH code, type code | Location in high-turnover areas (college towns, military installations, etc.) could increase volatility | Moderate |
| Rejected Deliveries | Mail pieces or packages marked Undeliverable- as-Addressed or Return to Sender (RTS) | Operations | UAA and RTS counts at an address for both mail pieces and packages | A spike in rejected mail or package deliveries could indicate a new resident receiving an old resident's mail, a sign of recent |  Moderate |

TABLE 3-continued

| Key Metric | Metric Description | Potential Data Source | Potential Data Attributes | Potential Volatility Score Impact | Potential Degree of Impact to Volatility Score |
|---|---|---|---|---|---|
| Volume of Mail Delivery | Number of letter/flat pieces delivered by a mail carrier to mailbox in a given timeframe | IV/OCR | Mail piece delivery counts to an address by mail piece type | address volatility Significant swings in mail volume could indicate resident turnover | Low |

Volume shift analysis performed by the volume shift engine may employ one or more machine learning models and/or methods. For example, the volume shift engine may utilize a temporal machine learning and/or Bayesian regression model to identify address attributes most associated with past and predicted item volume for addresses such that volume of items for the address can be predicted and/or estimated based on the prevalence of historical volume values. In some embodiments, the volume shift score or value could be based, at least in part, on various factors, metrics, or inputs. Examples and details of these metrics are provided in Tables 1-3 herein.

Figure 3:
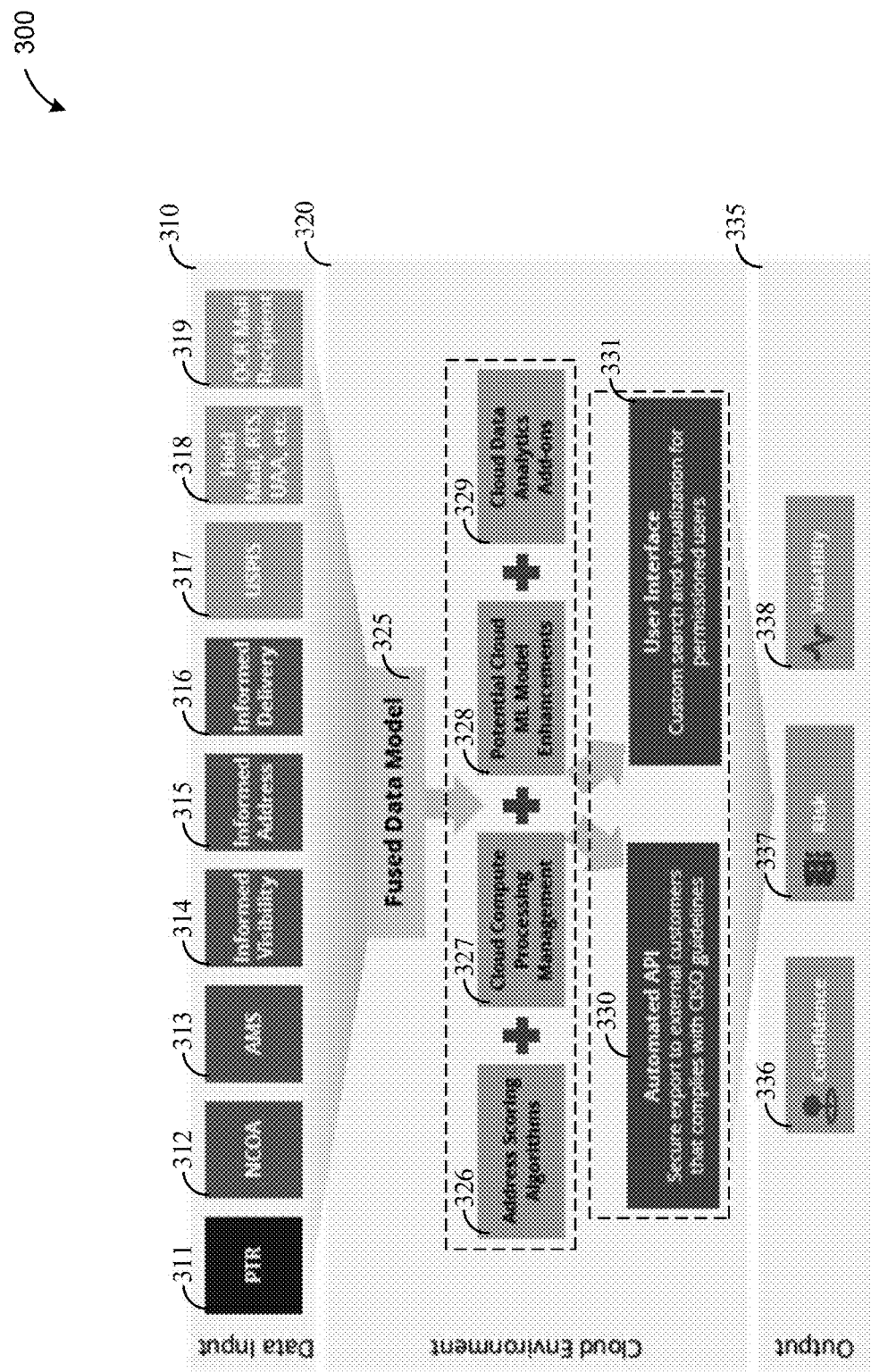
FIG. 3 is a diagram depicting an example of a data flow of inputs into the system, processing by the system, and outputs generated by the system.

FIG. 3 is a diagram depicting an example of an address system 300 that processes input data 310 in a cloud environment 320 to generate outputs 335. The diagram details how the input data 310, described in further detail below, is processed and stored in the cloud environment 320, for example by the system and components described herein (for example, the system 200 of FIG. 2A and address scoring system 250 of FIG. 2B). A model 325 in the cloud environment 320 applied to the input data 310 results in interim values stored or used by the cloud environment 320. The output 335 may be provided to a user, for example, via a user interface or an API, and so forth.

The data inputs 310 may include non-public address and delivery data from the distribution network 100 operational and digital systems, such as OCR images and PTR shipment files, that can provide daily insight into how and where individuals and businesses are interacting with the distribution network 100. Additionally, the data inputs 310 may include commercially-available address data from the distribution network 100, primarily, for example, from NCOA and DSF2, that is widely available to various government and industry organizations, either directly or through 3rd party resellers. Additionally, address data from financial institutions, utilities, and other sources that are widely available external to and used by existing data brokers, ID verification providers, distribution networks 110, and their customers. The data inputs 310 include PTR inputs 311, NCOA inputs 312, AMS inputs 313, informed visibility inputs 314, informed address inputs 315, informed delivery inputs 316, USPIS inputs 317, request inputs 318, OCR recipient inputs 319. The data inputs 310 described here may comprise the following data elements:

TABLE 4

| Data Inputs | Data Elements |
|---|---|
| OCR* | OCR Timestamp, Predicted Delivery Date, Addressed Name, Full Address (Standardized USPS Form), MailpieceID, Mail Class Type (First Class Mail, Standard Mail, EDDM, Business Reply Mail, Flat etc.), ZIP11 |
| AMS | zip11, state_abbr, congnl_state_abbr, delv_zip_code, zip_addon_high_nbr, del_pt_code, curr_delvpt_sys_id, del_ptusage_code, no_stats_code, rec_type_code, primary_nbr, str_name, str_suffix_abbr, predir_abbr, delv_mode_code, pub65_bfh_code, new_delvpttype_code, dlvry_pt, AMS_Regist_Name_Rural_Address |
| IV | eddm_cnt, mktg_ml_flts_cnt, mktg_ml_ltrs_cnt, oper_code_918_piece_cnt, oper_code_919_piece_cnt, per_flts_cnt, pfcm_flts_cnt, pfcm_ltrs_cnt, pkg_cnt, iv_volume |
| CustReg | First Name, Last Name, Full Address (USPS Standardized Form), Timestamp |
| ID | EMAIL_TOKEN, BRAND_DISPLAY, SITE_NAME, MACHINE_TYPE, MACHINE_NUM, TARGETNAME, Shape, MICS_ID, MAILPIECE_ID, WAS_NOT_RECEIVED, WAS_NOT_RECEIVED_DATE, SENT_TIME, EMAIL_READ, IS_ACTIVE, ACCOUNT_ZIP_5, COA_PENDING, Delivery_Date, CREATE_DATE, EMAIL_OFF_IN, DASH_USEAGE_DATE, DASH_USEAGE_TIME, ACCOUNT_ID, TIMESTAMP, SOURCE, CLICK_TRCKING_PK, CAMPAIGN_ID, CAMPAIGN_CODE, START_DATE, END_DATE, SUBMITTER_CRID, STATUS, BRAND_DISPLAY_NAME |
| NCOA | name_key, name, move_eff_date, tran_create_date, part_yyyymmdd, site_identification_number, transaction_id_number, old_address_zip_4_status, new_address_zip_4_status, move_status, createdate, tempmovetermdate, last_name, first_name, middle_name, prefix_title, suffix_title, old_address_urbanization_name, old_address_street_number, old_address_pre_directional, |

TABLE 4-continued

| Data Inputs | Data Elements |
|---|---|
| | old_address_street_name, old_address_street_suffix, old_address_post_directional, old_address_unit_designator, old_address_secondary_number, old_address_city_name, old_address_state_abbreviation, old_address_zip_code, old_address_plus_4_code, old_address_delivery_point_bar_code, new_address_urbanization_name, new_address_street_number, new_address_pre_directional, new_address_street_name, new_address_street_suffix, new_address_post_directional, new_address_unit_designator, new_address_secondary_number, new_address_city_name, new_address_state_abbreviation, new_address_zip_code, new_address_plus_4_code, new_address_delivery_point_bar_code, new_zip11, last_ncoa_date, first_ncoa_date, total_ncoa, ncoa_18_19, effectivedate, new_address_type, move_type, new_zip_5, new_zip_plus_4, new_dpbc, new_street_number, new_street_name, old_address_type, old_zip_5, old_zip_plus_4, old_dpbc, old_street_number, old_street_suffix, old_state_abbr |

To train accurate models for the confidence, risk, volatility, and volume shift scores or values, the systems and methods described herein incorporate various data sources from the data inputs 310 into the fused model 325. These data sources include inputs 311-319 described above. The fused data model 325 will include, at the address level, information regarding mail volume, package volume, change of address submissions, and fields from these systems. These data sources, once fused together into a unique data structure and prioritized for the phases of internal and external use cases, will be sufficient to provide address-based insights for various use case partners. The cloud environment 320 includes the fused data model 325 as well as address scoring algorithms 326 (which may comprise outputs from the fused data model 325). The cloud environment 320 may further comprise cloud processing management 327, cloud ML model enhancements 328, and cloud data analytics add-ons 329. In some embodiments, once or more of these cloud environment 320 components assists in generating the address scoring scores or values as described herein. The cloud environment 320 also includes an automated API 330 and a user interface (UI) 331. The API 330 and the UI 331 may enable the address scoring system 300 to interface with other systems, users, data sources, and the like. The API 330 may allow the system 300 to interface with one or more automated systems, for example a computing or data system of the distribution network 100. Similarly, the API 330 may allow integration of the system 300 with partner distribution networks or other partner systems. Similarly, the API 330 may enable customers, agencies, etc., to establish automated or remote access to the system 300 for on demand access. The UI 331 may enable a user or customer to perform customized operations using the system 300. The outputs 335 of the system 300 include the confidence score 336, the risk score 337, and the volatility score 338. Though not shown, an additional output may comprise the volume shift value described herein.

The systems and methods described herein can enhance the value and capabilities of existing products and services by leveraging data generated and collected internally and therefore reducing the reliance on third-party services (for example, verification services), providing better insight to augment supply chain management and supplement decision making in combating mail-related crime and abuse, and unlocking the value of the organization's unique data assets.

Address Scoring

The distribution network 100, for example via the scoring module 258, may implement the address scoring described herein and provide near real-time address/identification/resident validation and analytics based on the address scores. The scoring module 258 may receive various inputs and data from an array of systems associated with the IDS 100. In some embodiments, the processor 252 and/or the scoring module 258 may fuse, collate, or aggregate disparate data from multiple data sources. For example, the processor 252 develops one or more relationship models to perform associated address scoring analytics while maintaining the data securely.

The scoring module 258 and/or the processor 252 may process the inputs and data using one or more machine learning models or other AI algorithms or models to generate one or more address score outputs. The generated address score outputs (and another associated information, such as information regarding the records analyzed to generate the address score output) may be output as an output visualization, as described in further detail below.

In some embodiments, the scoring module 258 may generate the address scores based on input data that includes, for example, records of items delivered to one or more delivery points within a particular geographic area, such as a ZIP11 delivery area. In some embodiments, the ZIP11 delivery area comprises an area identified by ZIP+4 plus the corresponding two digit delivery code. In some embodiments, the scoring module 258 may generate scores based on information and/or data corresponding to all items delivered to all addresses serviced by the IDS 100. In some embodiments, the information and data used by the scoring module 258 may include identity data obtained from packages or similar items that correspond with a particular addressee, the information provided by the PTR. Alternatively, the scoring module 258 may obtain data from a wider selection of sources and include data from OCR, informed delivery, NCOA, and other identify data that can be used to enhance address scores and associations between individuals and addresses. In some embodiments, the scoring module 258 may also use publicly available information (such as publicly available real estate data and census data) when generating the address scores. In some embodiments, the scoring module 258 acquires data from the items being transported by the distribution network 100. For example, the scoring module 258 may have access to such OCRed and scanned name, identifier, and/or address data from items handled by the distribution network 100. Additionally, the scoring module 258 may access identity information that provide verification of name and address associations. Such data may increase accuracy of any confidence scores generated by the scoring module 258.

In some embodiments, the address scoring system 250 may be implemented in the cloud or using cloud-based resources. For example, the various components of the address scoring system 250 may use scalable storage and processing provided by cloud-based resources and systems. In some embodiments, the machine learning module 266 may be implemented using one or more cloud-based storage and/or processing resources and may be trained and retrained as needed based on additional input data and scaling of records being handled and/or processed by the machine learning module 266. In some embodiments, the machine learning module 266 and the scoring module 258 may run dynamically such that scores are refreshed automatically, at expected intervals, or on demand.

In some embodiments, the address scoring system 250 may be configured (for example, by software stored in the memory 256 or mass storage device 260) to exclude particular individuals from address scoring and/or machine learning processing. Additionally, the scoring module 258 and/or the machine learning module 266 may be configured to account for entities with multiple addresses, misspelled addresses, names, or other identifiers, perform address scoring and apply machine learning models on items with missing information (such as names, address information, and so forth), and even consider external factors in generating the address scores and/or applying the machine learning models. For example, in a geographic area with high levels of crime, the high levels of external crime (i.e., not related to items delivered by the distribution network 100) may influence or otherwise impact the address scores (for example, the risk score) generated by the scoring module 258. Address scoring can provide address verification as a part of a distributed/zero knowledge ID verification without requiring users to share address data with multiple third parties. Address scoring used in in-person proofing: can help federal agencies identify low-confidence users that will likely fail remote proofing, and funnel them directly to the distribution network 100 provisioned in-person proofing (IPP) methods instead. Address scoring can help the distribution network 100 keep physical address information current for informed address users when they fail to update their informed address registration in a timely manner.

One objective of the address scoring (otherwise referred to address verification, (AV)) effort is to design, build, and launch an analytics-based platform that harnesses available and/or unique data (for example, of the distribution network 100) to provide near real-time confidence, risk, and volatility scores and volume shift values on or for every delivery point in the country. These scores can create continuously updated insights about specific addresses, while the broader platform design lays a foundation for additional analytics-based products in the future.

Confidence Scores

The address scoring system 250 or the scoring module 258 may generate confidence scores following three general steps. The scoring module 258 may first group data and/or records being analyzed by a particular geographic area, such as a ZIP11 delivery point. The scoring module 258 may then calculate a total number of package deliveries in a predetermined timeframe. In some embodiments, the particular geographic area may be any other geographically defined delivery point area (such as a ZIP+4, ZIP, and so forth). For example, for a residence identified by the ZIP11 delivery point, the scoring module 258 may determine that a total of fifteen (15) packages are received in a week. In some instances, the total number of packages may be an average amount for the identified period of time.

After the total package deliveries are calculated for the delivery point, as a second step, the scoring module 258 may count a number of packages received per resident for or at the delivery point. At step three, the scoring module 258 may determine a probability score for each resident by identifying a particular individual's package volume as compared to the package volume for the ZIP11 delivery point. For example, when there are four residents that reside at the ZIP11 delivery point and there are fifteen packages delivered to the ZIP11 delivery point, Person 1 may receive four packages, Person 2 may receive three packages, Person 3 may receive two packages, and Person 4 may receive six packages). Thus, Person 1 will have a probability score of $4/15=0.27$, Person 2 will have a probability score of $3/15=0.2$, Person 3 will have a probability score of $2/15=0.13$, and Person 4 will have a probability of $6/15=0.4$. These probabilities may correspond to the confidence scores for those individual at the particular ZIP11 delivery point/address. In some instances, the more items that one of the individuals receives with respect to other individuals associated with the address, the higher the confidence score for that individual. In some instances, the total confidence for the address is based on the confidence scores for the individuals associated with the address. For example, when the number of items that each of the individual of the ZIP11 delivery point receives adds up to the total number calculated for the ZIP11 delivery point, the confidence for the address or delivery point may have a high score.

In some embodiments, the probability scores described above for each individual associated with the delivery point may be further analyzed and refined using one or more machine learning models, for example the probabilistic modeling, to further quantify the confidence score for the delivery point or individuals associated therewith based on historical information. For example, an amount of time that a particular individual has received items at the delivery point and/or an amount of items received over that amount of time or any other time of interest may be factored into the determination of the confidence score for the individuals associated with the delivery point. In some embodiments, the confidence scores may be integrated with a machine learning model and/or system to identify one or more scenarios based on the probability scores/confidence scores, for example as described in relation to FIG. 6. The confidence score generated based on the address scoring can provide metrics regarding whether items can be delivered to the corresponding address. Thus, a high confidence score as generated by the scoring module 258 can provide assurances and confidence that items (for example, marketing mailers) are reaching their intended audiences through corresponding distribution network products and services (for example, every door direct mail (EDDM)).

In some embodiments, an address confidence model is derived using temporal probability distributions equating to household or business entity package volumes relative to the total number of package deliveries at the corresponding address or delivery point. In some instances, a higher percentage of addressed packages to the total package volume reflects a higher confidence association; in some instances, the confidence score for the address is determined when the percentages of packages received by each entity at the corresponding address add up to 1 (for example, when the sum of the percentages of Persons 1-4 in the example above add up to or close to 1).

The below equation is an exemplary address confidence model:

$$Yt = AddresseeNameVol/TotalHouseholdPackageVol$$

Where t is aggregated across a period of time of PTR transactional package volume levels as a univariate probability model. The model can incorporate other data described herein, for example, data from Table 1.

In some instances, the address confidence scoring can include analysis of multiple different package and/or letter mail distributions across distinct timescales coupled with address and change of address characteristics. For example, one or more machine learning models and/or methods can be applied to the confidence scoring process to determine confidence level determinations through segmentation and/or supervised learning.

Risk Scores

The address scoring system 250 or scoring module 258 may generate risk scores based on three steps, including: (1) identifying addresses that are similar based on ingested attributes and group them together into one or more groups; (2) identifying addresses not included in any group from step (1) and labeling them as anomalous; (3) detecting addresses that have significant variances as compared to the group in which they are placed, etc., and label them as anomalous.

The risk score may be associated with a particular category or group. For example, a particular address may have one or more of an opioid risk score, a mail fraud risk score, an identity theft risk score, and so forth. For each type of risk score, there can be a group of ingest attributes to use in the risk score model. If the risk score is an identity theft risk score, a first group of attributes can be selected, including, those that relate to the identity of residents at a delivery point, types of items received, etc., which could indicate fraud. If the risk score is a opioid risk score, a second group of attributes can be selected, including those that could indicate sending opioids, such as origination location of an item, how postage was paid (e.g., cash, bitcoin, credit card), and others. There may be overlap between some of the attributes of the first and second groups. The risk score (and/or parameters for determining the risk score) for the particular address may be compared with data from addresses associated with identified and/or known risky behavior(s) (for example, known opioid behavior, known mail fraud behavior, and so forth) to determine the risk score for the particular address. One or more machine learning algorithms and/or models can be applied to corresponding data to help determine the risk score for the address and/or delivery point. In some instances, the risk score is not associated with individual entities associated with the delivery point. In some instances, the risk score is also tied to the individual entities associated with the delivery point.

For a risk score type, the relevant group of attributes are ingested into the hierarchical clustering algorithm, and the algorithm groups items based on the ingested attributes. Addresses that are not included in groupings, or which are not in a cluster are identified as anomalous. Further, the algorithm identifies addresses that have significant variance compared to their cluster, or which have a threshold variation from a others in a cluster or a central point in a cluster, and these are labelled as anomalous. The anomalous addresses are given higher risk scores than non-anomalous addresses. The value of the score can be based on the distance of the anomalous address from other clusters, or within a cluster. Further details are described below.

In some embodiments, the risk score may be determined using an unsupervised algorithm having no specific target. The algorithm may group addresses together based on one or more parameters and identify anomalous addresses. The anomalous addresses may be layered with category detection (for example, volatility detection) or similar additional analysis to place the anomalous address into a desired category. In some embodiments, distances between the addresses and clusters or groups of addresses are identified and used to separate the anomalous addresses from other clusters of addresses. The risk score for the specific address may be generated based on normalized distances from the anomalous address to one or more clusters on a linear and/or non-linear scale.

In some embodiments, the scoring module 258 may return an anomalous result based on a high volume of items or based on some other feature for the address or delivery point within an area relative to the address or delivery point. As one example, a school may be identified as having a high risk based on the number of items sent to that address compared to those of the addresses in the geographic area. Thus, the school may correspond to a false positive with respect to the area in which the school is located. In order to identify and exclude such false positives on the risk score, address and/or other data can be applied to the results of the risk score engine, or may be input before the risk score engine runs. The address data can include an identifier or delivery point type or specific delivery point, and can instruct the risk score engine to ignore or to exclude such address points. For example, schools, hospitals, churches, and similar "large" and entities or entities involving an unusually large number of individuals as compared to neighboring residences (for example, when located in residential neighborhoods) may be excluded when determining risk scores for addresses in the area including mostly residences.

In some embodiments, the address data can instruct the risk engine to run corresponding risk based machine learning and similar algorithms on delivery points of the specific type which are excluded from the engine as described above. In this way, different types of delivery points can be compared to each other, rather than to nearby, but unrelated types of delivery points.

A risk model employed by the fused data model may comprise an unsupervised or general machine learning technique to classify addresses across their respective letter and package volume levels relative to the address's characteristics through hierarchical clustering and/or similar machine learning algorithms and models. This method may employ a strict cluster formation criterion to maximize the distance between the distinct address alignments through a complete linkage parameter. For example, fifteen clusters may be selected based on variation capture across clusters using statistical validation and relative size for anomalous behavior detection. Tailored risk scores could be generated for specific types of risk. Below are exemplary features employed in the address risk model:

TABLE 5

| Feature | Description | Class | Source |
|---|---|---|---|
| ZIP3 | Delivery point's ZIP11 code | Input | AMS |
| state_abbr | Delivery point's two-letter state abbreviation | Input | AMS |
| home_age | Value given for age of home | Input | AMS |
| del_ptusage_code | A = Residential Usage B = Business Usage C = Primary Residential D = Primary Business Blank = None Usage | Input | AMS |
| rec_type_code | An alphabetical value that identifies the type of data in the record. F = Firm G = General Delivery Record H = High-rise Record P = PO Box Record R = Rural Route or Highway Contract Route S = Street | Input | AMS |
| delv_mode_code | Classifies mail delivery method (walking route, truck route, etc.) C = Curbline D = Dismount F = Foot P = Park and Loop O = Other | Input | AMS |
| new_delvpttype_code | Delivery point type (e.g. curbside) Indicate the type of delivery (mailbox) designated for the delivery point: A = CURBLINE B = NDCBU C = CENTRAL D = OTHER E = FACILITY BOX F = CONTRACT BOX G = DETACHED BOX H = NON-PERSONAL UNIT BOX J = DISMOUNT K = IDA L = SIDEWALK M = DOMESTIC MILITARY PO BOX N = COLLEGE/UNIVERISITY PO BOX S = CALLER SERVICE BOX T = REMITTANCE BOX U = CONTEST BOX V = OTHER BOX Q = GENERAL DELIVERY X = NOSTAT Blank = None delivery type | Input | AMS |
| eddm_cnt | Count of delivery point's mail volume according to EDDM | Input | IV |
| mktg_ml_flts_cnt | Count of delivery point's marketing flats volume | Input | IV |
| oper_code_918_piece_cnt | Specific Letter Piece Count 918 | Input | IV |
| oper_code_919_piece_cnt | Specific Letter Piece Count 919 | Input | IV |
| per_flts_cnt | Priority Flats Count | Input | IV |
| pfcm_flts_cnt | Priorty First Class Flats Count | Input | IV |
| pfcm_ltrs_cnt | Priority First Class Letters Count | Input | IV |
| iv_volume | Mail volume according to IV (only 4M addresses in EDL) | Input | IV |
| days_since_COA | Count of days since change of address occurred | Input | NCOA |
| move_type | Classifies move type | Input | NCOA |
| old_state_abbr | State individual moved from | Input | NCOA |
| areaname | Name of area associated with areaid | Input | PTR |
| total_ncoa | Count of change of address requests per address | Input | NCOA |
| Volatility_Prob | Volatility as predicted in model | Input | Model Output |
| package_volume | Package volume at a ZIP11 | Input | PTR |
| amz_package_vol | Amazon package volume at a ZIP11 | Input | PTR |
| dhl_package_vol | DHL package volume at a ZIP11 | Input | PTR |
| pitney_package_vol | Pitney Bowes package volume at a ZIP11 | Input | PTR |

TABLE 5-continued

| Feature | Description | Class | Source |
|---|---|---|---|
| household_package_vol | Total package volume at a ZIP11 | Input | PTR |
| priority_mail_package_vol | Priority mail package volume at a ZIP11 | Input | PTR |
| parcel_select_package_vol | Parcel select package volume at a ZIP11 | Input | PTR |
| global_priority_international_parcels_vol | Global Priority international package volume at a ZIP11 | Input | PTR |
| avg_postage_amount | Average postage for mail pieces received at a ZIP11 | Input | PTR |
| total_postage_amount | Total postage amount for mail pieces received at a ZIP11 | Input | PTR |

In some instances, the scoring module 258 may apply the risk model to identify a risk value for one or more addresses. For example, in some instances, a law enforcement entity may request identification of one or more addresses in a geographic area that are suspected of being a high risk address with respect to a particular behavior, such as mail fraud, counterfeit product distribution, drug production and/or distribution, and the like. Because mail volume and/or items received via the distribution network 100 may be indicative of the behavior, the scoring module 258 can use historical information for item distribution to addresses to predict whether one or more particular addresses are involved with the particular behavior. For example, when a residential address in a neighborhood receives a much larger number of credit card applications as the average address in the neighborhood (for example at least double the credit card applications as the average address), the residential address may be flagged as potentially being associated with the particular or risky behavior. As such, the risk score can be generated for the address based on a similar analysis for one or more particular behaviors.

As applied herein, the scoring module 258 may implement a method for identifying the risk value for the one or more addresses including a number of steps. For example, the method may comprise receiving a plurality of items for delivery to a specific address, obtaining, from the plurality of items, information regarding the items and the specific address, and delivering the plurality of items to the specific address. The method may further comprise identifying a request to identify addresses associated with a specific behavior, determining, based on the information regarding the address, a risk score for the specific address, wherein the risk score is a measure of the likelihood that the specific address is associated with the specific behavior, and comparing the risk score to a threshold value. Such a request may be received from law enforcement or a similar entity. In some instances, when the risk score for the address is greater than or equal to the threshold value, the method also comprises determining that the specific address is associated with the specific behavior, generating a visualization identifying the specific address and the risk score for the specific address and indicating that the specific address is associated with the specific behavior, and displaying the visualization via a user interface.

In some instances, determining the risk score for the specific address comprises identifying addresses in a geographic area shared with the specific address and identifying aspects of the identified addresses and the specific address. The geographic area may be a neighborhood. The aspects may comprise historical information (for example, details of previously received items) for the identified addresses and the specific address and wherein the aspects are associated with the specific behavior, generating clusters from the identified addresses and the specific address based at least in part on the identified aspects, and generating the risk score for the specific address based on the generated clusters. The clusters may be generated based on identifying which addresses share one or more attributes, such that clustered addresses share the one or more attributes, meaning the values for the one or more attributes are similar and/or the clustered addresses have values for the one or more attributes. In some instances, generating the risk score for the specific address further comprises identifying anomalous addresses based on identifying addresses of the identified addresses and the specific address are not placed in one of the generated clusters, identifying addresses in the generated clusters that have a value for an aspect that varies from the value for the aspect of the other addresses in the generated cluster by a threshold amount, determining whether the specific address is one of the identified anomalous addresses, and assigning the risk score for the specific address based on the determination whether the specific address is one of the identified anomalous addresses. For example the anomalous address may have attributes that indicate that the address receives double the mail relating to credit card applications and credit card mail as the average address in the geographic area (accounting for numbers of entities associated with the address). In some instances, the larger amount of credit card mail is indicative or a higher risk for credit card fraud or the like.

In some instances, the risk score assigned for the specific address exceeds the threshold value when the specific address is determined to be one of the identified anomalous addresses or does not exceed the threshold value when the specific address is determined to not be one of the identified anomalous addresses. For example, the address receiving double the credit card mail may be identified as anomalous because it cannot be grouped into a cluster because of the high number of credit card mail received. Alternatively, the address is anomalous because, even when clustered with other addresses as receiving credit card mail, the volume for that address is high enough that it is determined to be different enough than the other clustered addresses to be anomalous. In some instances, the specific behavior comprises one or more of fraud or criminal activity.

Volatility Scores

The address scoring system 250 or scoring module 258 may generate volatility scores to identify addresses or delivery points which have or are more likely to undergo turnover or a change of residents. In one example, the volatility score can be based on three steps, including defining a delivery point's change of address (COA) index as a number of COA requests submitted for the address in a particular period divided by a number submitted in a larger period. For example, the number of COA requests in a first period (e.g. 2018-2019) divided by the number of COA requests in a second period (e.g. 2017-2019) may be 2/4=0.5. In step 2, 80% of the data can be used in a training set with machine learning models (for example, Random Forest and/or hyperparameter tuning aspects) to identify attributes that are most associated with the change of address index. Some highly associated attributes may be total NCOA, address type, and/or home age. Attributes with low association may include a name of a recipient at a delivery point, such as is stored in the parcel tracking and reporting system (PTR). At step 3, the remaining 20% of data is used to test and tune the algorithm (for example, the machine learning model(s)) trained in step 2. For example, such testing may identify classes of volatility, including low, medium, high volatility classes. With a model trained using the data provided herein, additional addresses can be run in the volatility model, and the volatility model can determine a volatility score for an address or delivery point as high, medium, low, or can assign a particular score.

In some embodiments, the volatility score may incorporate the risk score. For example, the risk score may be combined with one or more other attributes to determine whether a particular address falls into the low, medium, or high volatility class.

In some embodiments, the address scoring system 250 can provide APIs, sandbox functionality, or other tools to allow particular entities access to confidence, risk, and volatility scores. Various entities may beneficially access and manipulate information from the address scoring system 250. Via APIs, the address scoring system 250 can allow access to selected data, to the scores, etc. In some embodiments, the address scoring system 250 does not provide any personally identifiable information (PII). In some embodiments, the resident, addressee, owner, etc., of an address can authorize the address scoring system 250 to provide access to individual or address scores to entities other than or outside the distribution network.

In some embodiments, the score information described herein can be beneficial to groups within the distribution network. In some embodiments the scores can be useful for identity verification processes, government agencies, financial service companies, health care companies, and others.

An address volatility model employed by the fused data model 325 may be trained using a supervised learning method using a hyperparameter tuned random forest technique. Such systems and methods are predicated on imputed learning, where the machine learning is tuned through iterative performance assessment not requiring human inferred assessment to maximize model accuracy as an AI controlled evaluation. A target for the prediction may be the ratio of a household's NCOA submissions relative to its historical NCOA history. A univariate statistical analysis may determine three classes for volatility based on the interquartile range of an address turnover history relative to thresholds, for example below the 25th percentile, between the 25-75 percentile, and above the 75th percentile into low, medium, and high confidence classes respectively. This model may be future-looking and predictive in nature and may have different likely volatility levels depending on the future time window (i.e., 3 months, 6 months, 1 year). Below are examples of features employed in the address volatility model (which may be a Random Forest model):

TABLE 6

| Feature | Description | Class | Source |
|---|---|---|---|
| address_vol_ind | Output value given as volatility predictor by model | Target | Model Output |
| ZIP3 | Delivery point's ZIP11 code | Input | AMS |
| state_abbr | Delivery point's two-letter state abbreviation | Input | AMS |
| home_age | Value given for age of home | Input | AMS |
| del_ptusage_code | A = Residential Usage B = Business Usage C = Primary Residential D = Primary Business Blank = None Usage | Input | AMS |
| rec_type_code | An alphabetical value that identifies the type of data in the record. F = Firm G = General Delivery Record H = High-rise Record P = PO Box Record R = Rural Route or Highway Contract Route S = Street | Input | AMS |
| delv_mode_code | Classifies mail delivery method (walking route, truck route, etc.) C = Curbline D = Dismount F = Foot P = Park and Loop O = Other | Input | AMS |
| new_delvpttype_code | Delivery point type (e.g. curbside) Indicate the type of delivery (mailbox) designated for the delivery point: A = CURBLINE B = CBU C = CENTRAL D = OTHER E = FACILITY BOX | Input | AMS |

TABLE 6-continued

| Feature | Description | Class | Source |
|---|---|---|---|
| | F = CONTRACT BOX G = DETACHED BOX | | |
| | H = NON-PERSONAL UNIT BOX J = DISMOUNT | | |
| | K = IDA | | |
| | L = SIDEWALK | | |
| | M = DOMESTIC MILITARY PO BOX N = COLLEGE/UNIVERISITY PO BOX S = CALLER SERVICE BOX | | |
| | T = REMITTANCE BOX U = CONTEST BOX | | |
| | V = OTHER BOX | | |
| | Q = GENERAL DELIVERY X = NOSTAT | | |
| | Blank = None delivery type | | |
| eddm_cnt | Count of delivery point's mail volume according to EDDM | Input | IV |
| mktg_ml_flts_cnt | Count of delivery point's marketing flats volume | Input | IV |
| oper_code_918_piece_cnt | Specific Letter Piece Count 918 | Input | IV |
| oper_code_919_piece_cnt | Specific Letter Piece Count 919 | Input | IV |
| per_flts_cnt | Priority Flats Count | Input | IV |
| pfcm_flts_cnt | Priorty First Class Flats Count | Input | IV |
| pfcm_ltrs_cnt | Priority First Class Letters Count | Input | IV |
| iv_volume | Mail volume according to IV (only 4M addresses in EDL) | Input | IV |
| days_since_COA | Count of days since change of address occurred | Input | NCOA |
| move_type | Classifies move type | Input | NCOA |
| old_state_abbr | State individual moved from | Input | NCOA |
| areaname | Name of area associated with an areaID | Input | PTR |
| total_ncoa | Count of change of address requests per address | Input | NCOA |
| package_volume | Package volume at a ZIP11 | Input | PTR |
| amz_package_vol | Amazon package volume at a ZIP11 | Input | PTR |
| dhl_package_vol | DHL package volume at a ZIP11 | Input | PTR |
| pitney_package_vol | Pitney Bowes package volume at a ZIP11 | Input | PTR |
| household_package_vol | Total package volume at a ZIP11 | Input | PTR |
| priority_mail_package_vol | Priority mail package volume at a ZIP11 | Input | PTR |
| parcel_select_package_vol | Parcel select package volume at a ZIP11 | Input | PTR |
| global_priority_international_parcels_vol | Global Priority international package volume at a ZIP11 | Input | PTR |
| avg_postage_amount | Average postage for mail pieces received at a ZIP11 | Input | PTR |
| total_postage_amount | Total postage amount for mail pieces received at a ZIP11 | Input | PTR |
| cluster | Output value from model | Input | Model Output |
| riskclass | Output value from risk model | Input | Model Output |
| riskscorecomp | Output value from risk model | Input | Model Output |

In some instances, the scoring module 258 may apply the volatility model to identify a volatility score or value for one or more addresses. For example, in some instances, the distribution network 100 may track when entities associated with addresses change and utilize such information to provide data and/or recommendations to mailing entities. For example, the distribution network 100 may identify when particular residential addresses have high turnover of residents and recommend to the mailing entities (for example, entities mailing advertisements, etc.) to not address mailed items to particular recipients because of high turnover. Alternatively, or additionally, the distribution network 100 may provide recommendations as to how often to resend mailers given a likelihood that the recipient at an address is likely to have changed due to predicted turnover. Thus, an analysis of the turnover for the address can provide various information that the distribution network 100 can identify and provide to customers to improve customer marketing efforts and the like.

In some instances, the scoring module 258 applies or performs a method of identifying occupant turnover. The method may comprise receiving a plurality of items for delivery to an address, obtaining, from the plurality of items, information regarding at least one entity to which the plurality of items is directed to and the address, and identifying that the at least one entity is not a first entity with which the address is associated in records in a database. The method may further comprise comparing a volatility score for the address to a threshold volatility value, wherein the volatility score is a measure of a likelihood that the address experiences turnover with respect to associated entities over a period of time, updating the records in the database to associate the at least one entity with the address when the volatility score exceeds the threshold volatility value, and delivering the plurality of items to the address. For example, when the volatility score exceeds the threshold, the address may be more likely than the average address in the geographic area to have entity turnover. In some embodiments, when the volatility score exceeds the threshold, the address is expected to have turnover in a defined period of time (for example, 1 year, 6 months, and so forth). The volatility score for the address may place the address in one of a number of buckets, where each bucket corresponds to a different "level" of expectation for turnover at the address. For example, a high turnover bucket may include addresses for which higher than average turnover is expected, and average turnover bucket may include addresses with an average amount of turnover for the geographic area, and the low turnover bucket may include address for which lower than average turnover is expected. The method may also comprise generating a visualization identifying the volatility score for the address and an indicator that the at least one entity is added to the records in the database and displaying the visualization via a user interface.

In some instances, the method further comprises determining the volatility score for the address based on historical information regarding the address. The historical information may be historical information of items delivered to the address and/or change request forms received for the address in the past, such that an average turnover for the address can be determined or calculated. In some instances, determining the volatility score comprises identifying a change of address index for the address, wherein the change of address index comprises a comparison of change of address requests received for the address over two disparate time periods and provides a recency of turnover for the address. The recency of turnover may relate to how recently the latest turnover occurred. The change of address information may comprise information received from change of address requests from entities associated with the address. For example, the change of address request may be received from the entity when the entity is moving from the address. In response to such requests, the distribution network 100 (for example, via the system 200 or the address scoring system 250) may update records for the address and/or the entity. In some instances, the method further comprises applying a machine learning model to identify attributes of the historical information most associated with the change of address index, wherein the identified attributes, as identified from the historical information, correlate to aspects of the address that are commonly associated with high turnover of entities associated with the address. For example, addresses near a school such as a university or college may have higher than average turnover as compared to all residential addresses. Similarly, addresses belonging to older buildings may also experience higher than average turnover than most residential or commercial addresses. In some embodiments, applying the machine learning model results in classifying the address in one of a plurality of classes each corresponding to a different level of volatility.

In some embodiments, the method further comprises identifying approximately when the first entity stopped receiving items at the address, identifying that the first entity started receiving items at a new address within a threshold period of when the first entity stopped receiving items at the address, and updating the records in the database to associate the first entity with the new address. For example, since the distribution network 100 may track items received at an address or by an entity, the distribution network 100 may determine when one of the entities changes addresses, even if the entities fail to make a change of address request. For example, then distribution network 100 can determine when or approximately when items for a particular address or delivery point change between one or more entities, for example from a first entity to a second entity. Additionally, the distribution network 100 can determine if the first entity also begins receiving items at a different address at approximately the same time as when the entity stopped receiving items at the address. Thus, the first entity may have failed to file a change of address request with the distribution network 100 but may have updated certain mailers. Thus, the distribution network 100 may automatically make change of address updates even if the entities fail to do so.

Volume Shift Scores

The volume shift score or value can be used in a variety of applications. In one instance, a furniture store or furniture company may desire to send an advertisement and schedule the arrival of the advertising mail item so that it is the only home goods related mail item on a given day, or on a day where the likelihood of another home goods piece is the lowest. In another instance, an advertiser may wish to send an advertisement to addresses where certain types of utility bills are received. In another instance, an advertiser may wish to send an advertising mail item and to have the mail item arrive on a day on which a particular address or group of addresses receive the fewest number of advertisements. The distribution network 100 can use volume shift scores to provide to item senders a schedule or timeline of when the items should be provided to the distribution network 100, where the items should be inducted, etc., in order for the item to arrive at the desired delivery points on the desired days. Other applications for the volume shift score are also contemplated by this disclosure. Using existing data, the systems and methods described can generate insights into delivery frequency of different mail and package classes to an address. For example, the volume shift score can identify or predict how many items an address will receive, what kind(s) of items (for example, sporting related, class related, and so forth), which resident is receiving the items, and so forth. Thus, an address with multiple residents or entities can have a single or multiple volume shift scores. The single volume shift score may be an average of the volume shift scores for the individuals associated with the address. In some embodiments, the volume shift score can detect changes or anomalies for a particular address or residence, for example relative to previous volume shift scores or as compared to neighboring volume shift scores.

The volume shift module 270 can take as an input a number or quantity of items received at a given delivery point, the identity and/or sender of the items, the day the item was sent, the day the item was received, and other information. The volume shift score will be described with regard to one delivery point, but the address scoring system 250 may determine volume shift scores or values for some, many, or all delivery points in a distribution network.

The volume shift module 270 can receive historical data for a particular delivery point, such as a residential or commercial address, a mailbox, etc. For illustration, the delivery point will be described as a residential address. The historical data can relate to or include a number of items, including mail, flats, parcels, etc., that were delivered to an address. The historical data may also include an identifier for the sender of each of the items. The senders can be determined by Mailer ID's (MIDs) or other identifiers on the mail items. This information can be obtained, for example, from the Informed Visibility System, PTR, and/or other connected systems after processing the mail items in the distribution network 100. In some embodiments, the volume shift historical data comprises information regarding delivery. For example, distribution of mail items to an address can be averaged for different weeks across addresses within a particular geographic area defined by a ZIP code or ZIP11. For example, during a first week, addresses may receive an average of 6.1 marketing mail pieces, 3.4 non-marketing mail pieces, and 0.9 packages (0.1 priority packages and 0.8 non-priority packages). During a second week, addresses may receive an average of 1.9 marketing mail pieces, 1.7 non-marketing mail pieces, and 0.7 packages (0.1 priority packages and 0.7 non-priority packages). During a third week, addresses may receive an average of 8.6 marketing mail pieces, 4.0 non-marketing mail pieces, and 0.7 packages (0.1 priority packages and 0.6 non-priority packages). In some instances, these volume breakdowns can include types of mail (for example, the 8.6 marketing mail pieces may include 82% marketing mail letters and 18% marketing mail flats and the 0.6 non-priority packages can include 31% parcel select packages, 27% first class packages, and 42% other packages. By using such existing data, the distribution network 100 can generate insights into the delivery frequency of different mail and package classes to an address. Furthermore, by adding predictive analysis to various information available, the distribution network 100 could add value to mailers' campaigns by recommending optimal mail piece delivery dates for an address. For example, the volume shift module 270 may identify that the addresses receive the fewest number of marketing mail items during the second week and use that information to predict that a future week will have a similar number of marketing mail items and recommend that future week to entities looking to send marketing mailers. For example, if the second week identified above is a second week of a first month and the volume shift module 270 determines that the historical analysis of the volume shift indicates that the same trends repeat monthly, then the address scoring system 250 may determine that the second week of the second month will be recommended to advertisers or similar entities for mailing marketing mail items to the address.

The volume shift module 270 can analyze the senders of items and can categorize items according to sender and by type. The volume shift module 270 can, for example, determine how many bills (utility, credit card, etc.) were received on a given day, how many pieces of advertising mail were received, how many pieces of certified or priority mail, and how many parcels were received. These categories are exemplary only. The advertising mail and other categories can be further classified according to sender and type. For example, the advertising mail and utilities can be classified according to sender. In the case of the utility bill, it can be categorized by sender, such as cable company, phone bill, electricity bill, etc. In an example of the advertising mail, the advertising mail can be categorized according to a wide variety of types or topics, such as cars, outdoor activities, home goods, sports, food, electronics, and any other desired category.

The volume shift module 270 gathers information for a determined historical period, such as a week, a month, six months, a year, etc., and determines volume and sender identities for each day in the determined historical period, and categorizes the senders. In some embodiments, the volume shift module 270 can also identify on which days every door direct mail (EDDM) was to be delivered and who the sender was. For example, the distribution network 110 can predict when ZIP11 delivery volume is likely to experience a statistically significant shift based on historical delivery volumes.

The volume shift module creates a data set or map of the historical information. The data sets can be grouped in a variety of ways. The data sets can be organized by day, by week, by month, etc. In one example, the volume shift module can generate a weekly data set, which the daily volume, type, sender, etc., information. The volume shift module 270 can compare a first weekly dataset with a subsequent weekly dataset. The volume shift module 270 can use such comparisons for identifying volume shift values and so forth.

In some embodiments, the volume shift module 270 can compare datasets within a week, for example, compares Monday to Tuesday to Wednesday, etc., for a given week. The volume shift module 270 can generate a mean for a day, for a week, etc. The volume shift module 270 can identify days, weeks, etc., where the volume for all items or for a particular type of items exceeds a standard deviation or other value from the mean. This comparison can be a comparison between a Wednesday to a Thursday in the same week, or between a Tuesday in one week and the Tuesday in the following week, or any other desired days or time periods.

In some embodiments, a machine learning model can be trained using historical volume and type data. The machine learning model can be used to predict a day on which a particular type of item is most likely to arrive, least likely to arrive, etc. In some embodiments, a customer can provide a particular request, and the machine learning model can identify a time period which may most likely satisfy the particular request.

In some embodiments, the volume shift module can generate a measured central tendency of a given delivery point, which can be an average volume or daily change in volume over a given time period. In some embodiments, the time period is three weeks. A subsequent or prior time period can then be compared to the measured central tendency. When there is a change in volume for a given day or given week which exceeds one, two, or more standard deviations from the measured central tendency, these are identified in the data as variations. The machine learning model works to identify these types of patterns in the data for a given delivery point. The model can identify when the volatility, that is, the change in the number of pieces, or in a type of pieces, is expected to be lower than the mean central tendency, when the volatility or change is expected to be higher than the mean central tendency, and so forth. The model can use identified historical patterns to predict volatility, or times of volume change for given delivery points for all items, certain types of items, and the like, for a particular address or groups of addresses.

The model can also identify when the content distribution changes. For example, although the volume of items may be unchanged, the model can identify and predict when the content is likely to change. For example, a residential address gets 4 pieces of mail per day, on average, spread across several types of items (for example, 1 package, 1 non-marketing mail item, and 2 marketing mail items). The model can identify times where the number of mail items does not change beyond a standard deviation from the measured central tendency, but where the number of mail items related to one category or type, e.g., non-marketing type mail items or mail items relating to home electronics goes up while the number of mail items related to a second category, e.g., marketing type mail items or mail items relating to sports (or to all other categories) goes down. Such changes in content can indicate a change in the habits, patterns, identity, or other feature of the residents. The volume shift module 270 can capture such changes and identify likely causes of the change in event, such as the purchase of a home, a change in residents at an address, the birth of a child, a birthday, or other cause. Such changes can also indicate to mailing entities when it best to send particular mail items or types of mail items. In some embodiments, the model can determine a measured central tendency for individual types of items, such as parcels, marketing mail, first class mail, etc., and can identify when each type of item exceeds the mean central tendency by a set number of standard deviations.

In some embodiments, the volume shift module 270 can compare the determined information for one address with neighboring addresses, for neighborhoods, streets, zip codes, cities, or any other geographic boundary. The volume shift module 270 can then generate a volume shift score for a larger area than just a single delivery point, such as a neighborhood volume shift score, a zip code volume shift score, and the like.

In some embodiments, the volume shift module 270 can obtain data on items sent from a particular delivery point. For example, the historical data can include items that were sent from a particular delivery point, and an identification of the item or type of item which was sent, and the recipient of the sent item. This can include, for example, product returns, payment of bills, responses to business reply mail, and the like. The volume shift module 270 can categorize parcel returns, such as where an item with a return authorization was sent from the delivery point to a returns facility, a manufacturer, or other location. The return authorization and other data may be used to determine the identity of the item. When a utility sends a bill, the utility can include a reply envelope with a code thereon. The volume shift module 270 can use information regarding reply envelopes and the codes thereon as part of the volume shift score. A sender may then request information on delivery points that have returned a shirt, or an item to a clothing seller or manufacturer, and these locations can be anonymously provided to the sender. The volume shift information for these categorized returns can also be utilized in a volume shift score. For example, such results can inform the sender when to request particular returns or when to deliver the item to maximize/minimize likelihood of returns for the corresponding article.

In some embodiments, the volume shift module 270 can determine when bills are usually paid, or when a response in business reply mail is sent. A sender may desire to identify when bills are getting paid via the mail, and can identify a deviation in the timing or volume of that change.

In some embodiments, a potential mailer can request to send an item, such as a mailer to a subset of addresses in a geographic area. The subset of addresses can be, for example, a list of addresses that did not receive any items from candidates, groups, or other entities affiliated with a particular political party. Political mail and election mail can be identified based on a code thereon, such as a MID. A sender can request the delivery points that did not get mail from a particular party or which did receive mail from a particular political party. The system 250 can identify these delivery points within a geographical area, and can provide anonymized delivery point information, such as a code, either encrypted or unencrypted. The code can be used on the processing equipment in the distribution network to identify the actual delivery point once an item having the code thereon is received in the item processing equipment.

In some embodiments, the volume shift score can predict trends, such as identifying which delivery points in an area are first adopters, influencers, etc. For example, the volume shift module 270 can use the volume shift information to identify where an influencer is located. An influencer can be an individual, business, street, neighborhood, or other entity that affects the habits of those around it, such as a person in a neighborhood, or a small group of people, or a neighborhood, etc., that adopts a technology earlier than others, who persuades others to buy a particular item, or who sets trends that others follow. The volume shift module 270 can identify a delivery point which sees an initial increase in volume of items of a certain type delivered and a sustained higher level of these types of items. Where the volume shift module 270 can identify this type of delivery point, and can evaluate the historical item volume of similar items within a geographic location, across a selected demographic, or within another selected groups. The volume shift module 270 can identify, based on this information, a delivery point of an influencer.

The volume shift module 270 can identify which delivery point in a given geographic area which was the first delivery point to receive an item from a new company, or the first delivery point, or a cluster of delivery points which were the first to receive a new item from a particular sender.

The volume shift module 270 can further gather information regarding the time of day a delivery point receives items, such as mail. In the example of the USPS, a carrier traverses a route every day, generally in the same order. The addresses at the beginning of the route generally receive mail earlier in the day, and the addresses at the end of the route receive mail deliveries later in the day. The volume shift module 270 can use this information to identify a plurality of delivery points within an area, or across several areas which receive mail at a given time. A sender may wish to send items to a delivery point where the mail is delivered early in the day, or at another time. The volume shift module 270 can generate this information and provide anonymized delivery point identifiers, such as codes, to a party requesting this information.

In one example, a company that sells items that appeal may desire to have a list of addresses where mail is delivered around or before the time school gets out. In such a case, it is more likely that a school-aged child may get the mail as the child walks home from school or from a bus stop. A sender may think that if a particular resident at an address picks up the mail from the mailbox, the person most interested in the item may see the advertisements for the products, and be more likely to be interested in the product advertised. Thus, the sender may request delivery points for items that are generally delivered in the afternoon. This is exemplary only, and other times or parameters can be determined as desired.

In some embodiments, the volume shift module 270 can identify delivery points or locations which are home businesses. Where a residential address sends a lot more packages than another address in the same area, the volume shift module 270 can identify that location as a likely home business. As such, particular services from the distribution network 100 or other third party services targeted to home or small businesses may be advertised to the residential address determined to be a home business.

In some embodiments, the volume shift module 270 can aggregate data for neighborhoods based on volume shift scores for neighborhoods, streets, etc. The system can identify neighborhood-wide, street level, or other trends that spread over larger geographic areas.

In some embodiments, the volume shift module 270 may apply a temporal machine learning model, for example a Bayesian regression model, trained to predict future delivery volumes. For example, the volume shift module 270 may define a volume shift for a geographic region as a predicted delivery volume having a statistical variance relative to its average historical volume. In some embodiment, the volume shift module 270 works with volume shift control bands, for example bands identified by the volume being less than an average or mean volume less a threshold amount or the volume being greater than the average or mean volume plus the threshold amount. The volume shift module 270 may apply the temporal model to the predicted delivery volume to project whether the geographic region will experience a volume shift.

Furthermore, in some embodiments, individual items may change one or more of the confidence score, risk score, volatility score, and volume shift values. For example, an item that is delivered requiring a signature or verification of receipt may have a greater impact and raise/lower the confidence score based on the verification being completed properly.

In some instances, the scoring module 258 or the volume shift module 270 may apply the volume shift model to identify a volume shift score or value for one or more addresses. For example, in some instances, the distribution network 100 may track how much mail (i.e., items) one or more addresses receives over a period of time, for example daily, weekly, monthly, and so forth. Such information can be used to suggest to mailers when to have items delivered to entities at addresses to improve responsiveness by the entities. For example, the distribution network 100 may determine that particular addresses or addresses in a particular geographic area receive mail items in cycles such that a particular day in the week or week in the month receive fewer mail items than the average day or week. The distribution network 100 may use this information to recommend that mailers have items delivered during these periods of fewer mail items. Furthermore, the distribution network 100 may identify when and/or where the items to be delivered for the mailer(s) should be introduced into the distribution network 100 to ensure delivery to the addresses during the identified periods of fewer mail items. This may help the mailers to attain better contact with the entities at the addresses because the entities may be more likely to review the received mail items when they do not receive a large number of items, for example during the periods of reduced mail.

In some embodiments, the scoring module 250 and/or the volume shift module 270 may be configured to perform one or more methods. For example, the volume shift module 270 may perform a method comprising receiving a plurality of items for delivery to an address, obtaining, from the items, information regarding the items and the address, and storing the obtained information in a database. The method may further comprise receiving a request for information regarding distributing a targeted item to the address, wherein the request for information includes a request for timing information relating to distributing the targeted item to the address, determining an average historical volume of items for the address over a historical period (for example, a week) based on the stored information, and determining, based on the stored information, a reduced volume shift value for the address for a future period having a similar length (for example, a week) as the historical period, wherein the reduced volume shift value is a measure of a predicted volume of items the address is expected to receive in the future period that is less than the average historical volume for the address by a threshold amount. The method may also comprise generating a visualization identifying one or more of the reduced volume shift value score for the addresses, the future period, and a distribution date by which the targeted item needs to be provided to ensure distribution to the address within the future period and displaying the visualization via a user interface.

In some instances, the threshold amount by which the reduced volume shift value is less than the average historical volume is determined based on an identified statistical variance relative to the average historical volume and wherein the threshold amount is greater than or equal to the identified statistical variance. In some instances, the average historical volume of items comprises a breakdown of average historical package volume and average historical non-package volume and wherein the average historical non-package volume comprises a breakdown of average historical marketing volume and average historical non-marketing volume and wherein the reduced volume shift for the address for the future period having the similar length as the historical period is a measure of a predicted volume of marketing items the address is expected to receive in the future period that is less than the average historical marketing volume for the address by the threshold amount. In some instances, determining the reduced volume shift value comprises applying a temporal machine learning and/or Bayesian regression model to predict whether the address will experience a volume shift at which the targeted item will be distributed to the address.

Figure 4A:
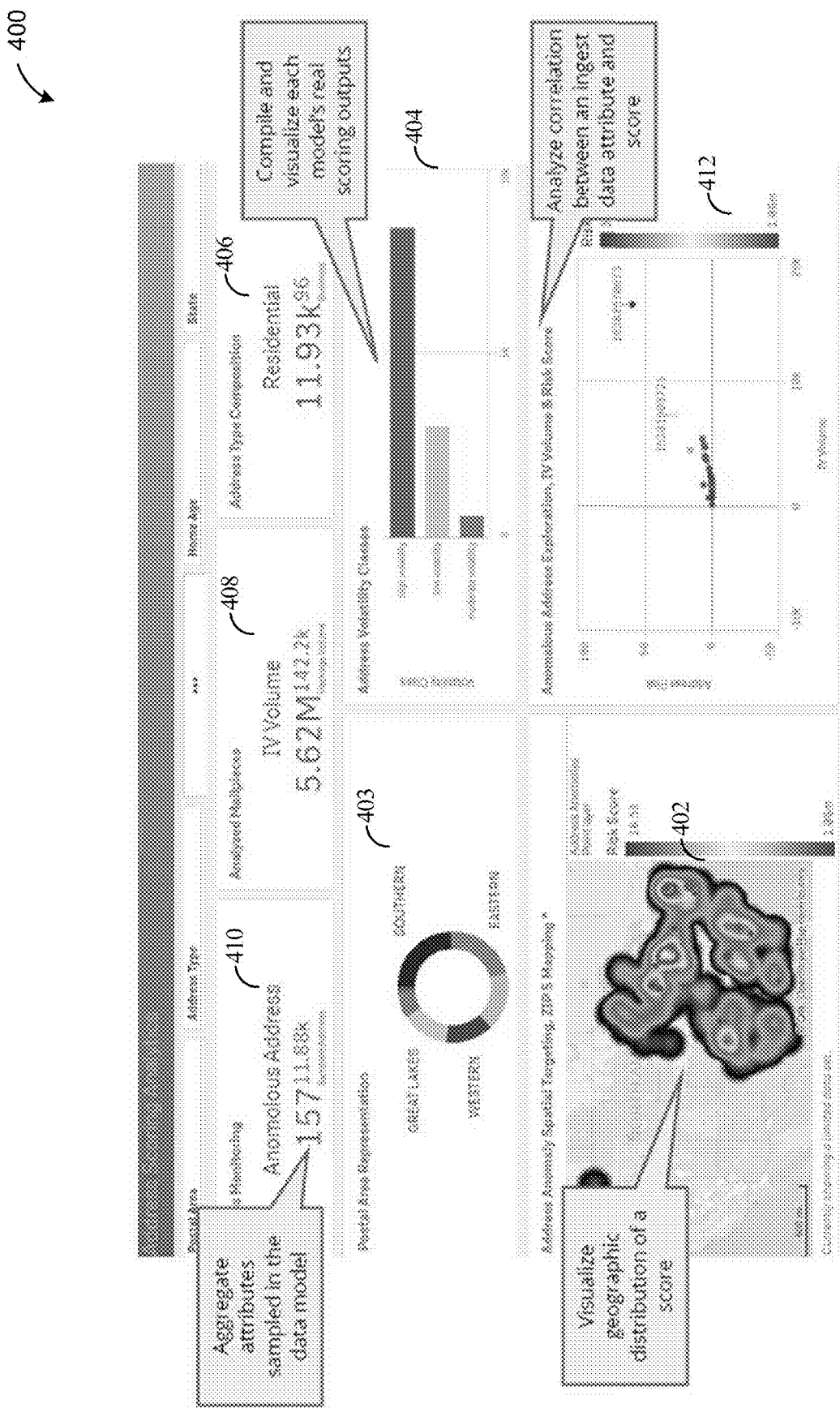
FIG. 4A is an output generated by the system that demonstrates how delivery point information and analytics can be displayed for users.

FIG. 4A is an output generated by the address scoring system 250 that demonstrates how delivery point information and analytics can be displayed for users. For example, an output visualization 400 generated by the address scoring system 250 displays analytics and aggregated insights from the analysis of data and records associated with address with respect to generating address score values, as described herein. For example, when the address scoring system 250 is applied to a random sample of about 12,000 unique address delivery points that were classified with the distribution network 100 as being curb or sidewalk delivery types, the address scoring system 250. Disparate production data structures (for example, an address scoring fused data structure that comprises a data structure for the different address scoring aspects, such as the confidence score, the risk score, and the volatility score, as described herein) were fused in a distributed computing environment and a two-tiered Simple Random Sampling technique to preserve the representative qualities of address patterns. A custom random seed and shuffle machine learning approach may be incorporated into the sampling algorithm to minimize statistical bias of predictive outputs generated by the prototype engine.

The output visualization 400 includes a visual geographic distribution of scores for the randomized sample data. The output visualization 400 provides a graphical view 402 of where high and low risk scores are generally located. In some embodiments, the geographical view 402 may show that high and low risk scores are randomly distributed around or clustered in one or more areas in a geographic area. Such a mapping may help indicate that addresses having high risk scores are relatively rare and can be located in various geographic locations. The output visualization 400 also provides a graph 412 showing address risks for particular addresses analyzed, for example, associated with an amount of item volume as determined by the distribution network 100. Thus, the output visualization 400 provides results of an analyzed correlation between ingested data and the corresponding risk score, though the same can be provided for any of the confidence, volatility, and volume shift scores or values.

The output visualization 400 also includes a number of anomalous addresses identified in the addresses that are or were monitored. For example, of the approximately 12,000 addresses for which data from the distribution network 100 and similar sources was aggregated and/or analyzed, the address scoring system 250 identified only 157 of those addresses as being anomalous and/or potentially having higher than average risk scores. The output visualization also provides a representation 403 of a geographic area distribution of the about 12,000 addresses. In some embodiments, the output visualization 400 incudes a comparison 404 of address volatility classes, grouped into "high", "moderate", and "low" volatility. The output visualization 400 also includes a quantity of analyzed addresses and address types 406 (for example, 11.93 k residential addresses as compared to 96 business addresses), a number of analyzed items 408 (for example, 5.62 million items for the approximately 12,000 addresses, with 142.2 k packages), and the number of anomalous addresses 410 identified from the analysis of the addresses. Thus, the comparison 404 shows how the about 12,000 addresses analyzed fall into one of the low, moderate, and high volatility classifications. The comparison 404 may show how outputs for applied models related to the particular score being analyzed are compiled and/or visualized. In some embodiments, the output visualization 400 may be adapted to enable selection of one or more user groups and may be tailored to provide specific information dependent on user customized specifications.

Figure 4B:
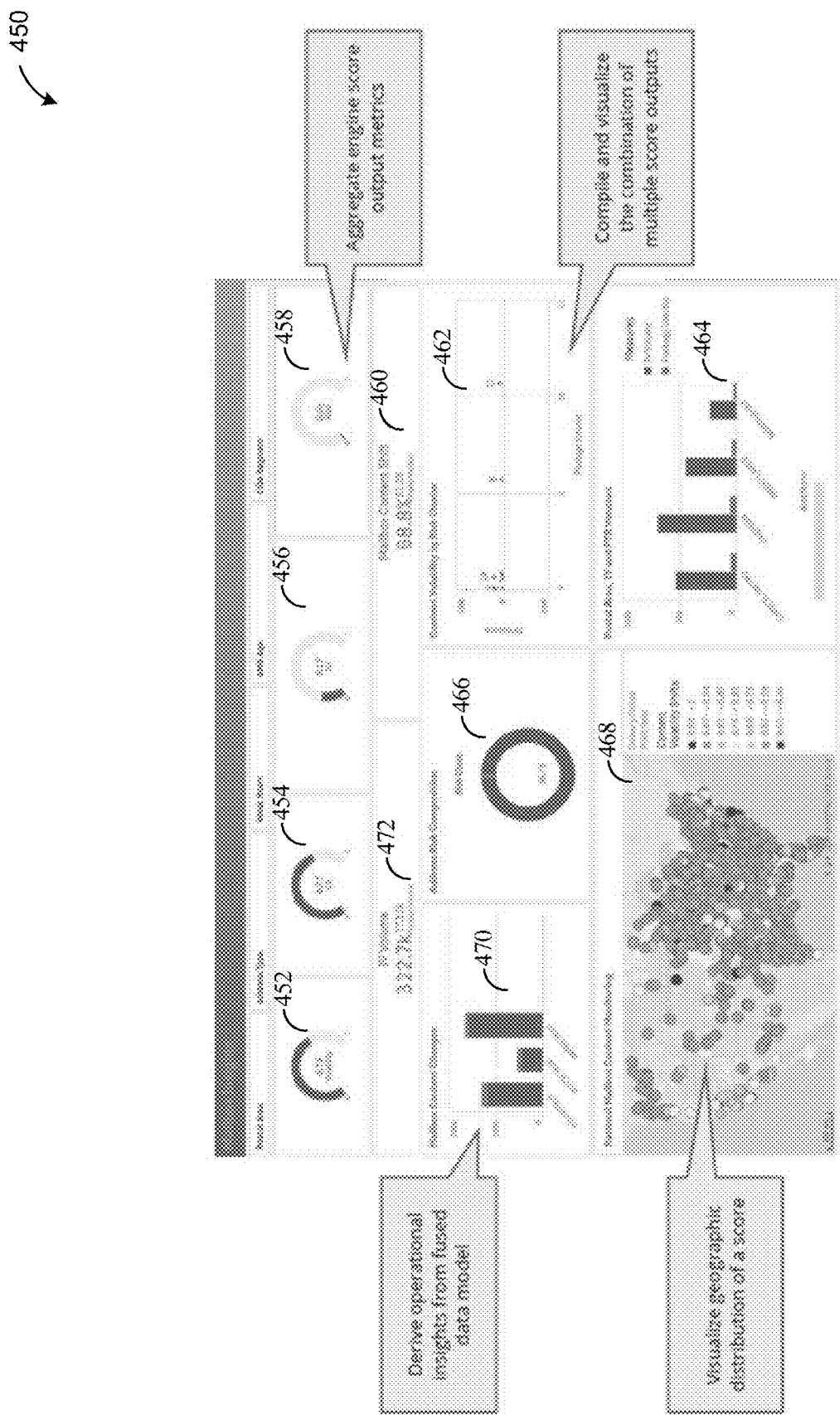
FIG. 4B is an output generated by the system that demonstrates how delivery point information and analytics can be displayed for users.

FIG. 4B is an output generated by the address scoring system 250 that demonstrates how delivery point information and analytics can be displayed for users. For example, an output visualization 450 generated by the address scoring system 250 displays analytics and aggregated insights from the analysis of data and records associated with address with respect to generating address score values, as described herein. For example, the output visualization provides the user with the volatility score 452 (here, the address having a volatility score of 0.74), a confidence score 454 of 0.77, an informed delivery value of 0.17, and a risk value of 0.1. The output visualization 450 also includes volume shift 460 of the address, for example indicating that the mailbox content shift value of 68.8% content shift value with a 31.2% stable mailbox value. The output visualization 450 further includes a graphical comparison 462 of volatility of content according to risk score cluster, package volume for the address(es) disposed along the y-axis, with the informed visibility volume along the y-axis. The output visualization 450 may further show a graphical comparison 464 with geographic locations along the x-axis, informed visibility or package volume along the y-axis, and two bar graph values for each geographic location for informed visibility volume and package volume. In some instances, the output visualization 450 also includes a risk class portion 466 that shows how small a number of the sampled addresses (i.e., 1.22% are considered high risk or in a risky class) while a large number of the sampled addresses are not risky. At 468, the output visualization 450 provides how the volume shift values for addresses are distributed around or across an entirety of the geographic area (for 470, the entirety of the continental US). At block 470, the output visualization 450 provides a measure of volume shift, specifically how a content of the mailbox shifts. For example, the block 470 provides a graph with dates or time along the x-axis and volumes along the y-axis. The block 472 provides a numerical display of the informed visibility volume of 322.7 packages and a package volume of 27.52 k items.

Figure 5:
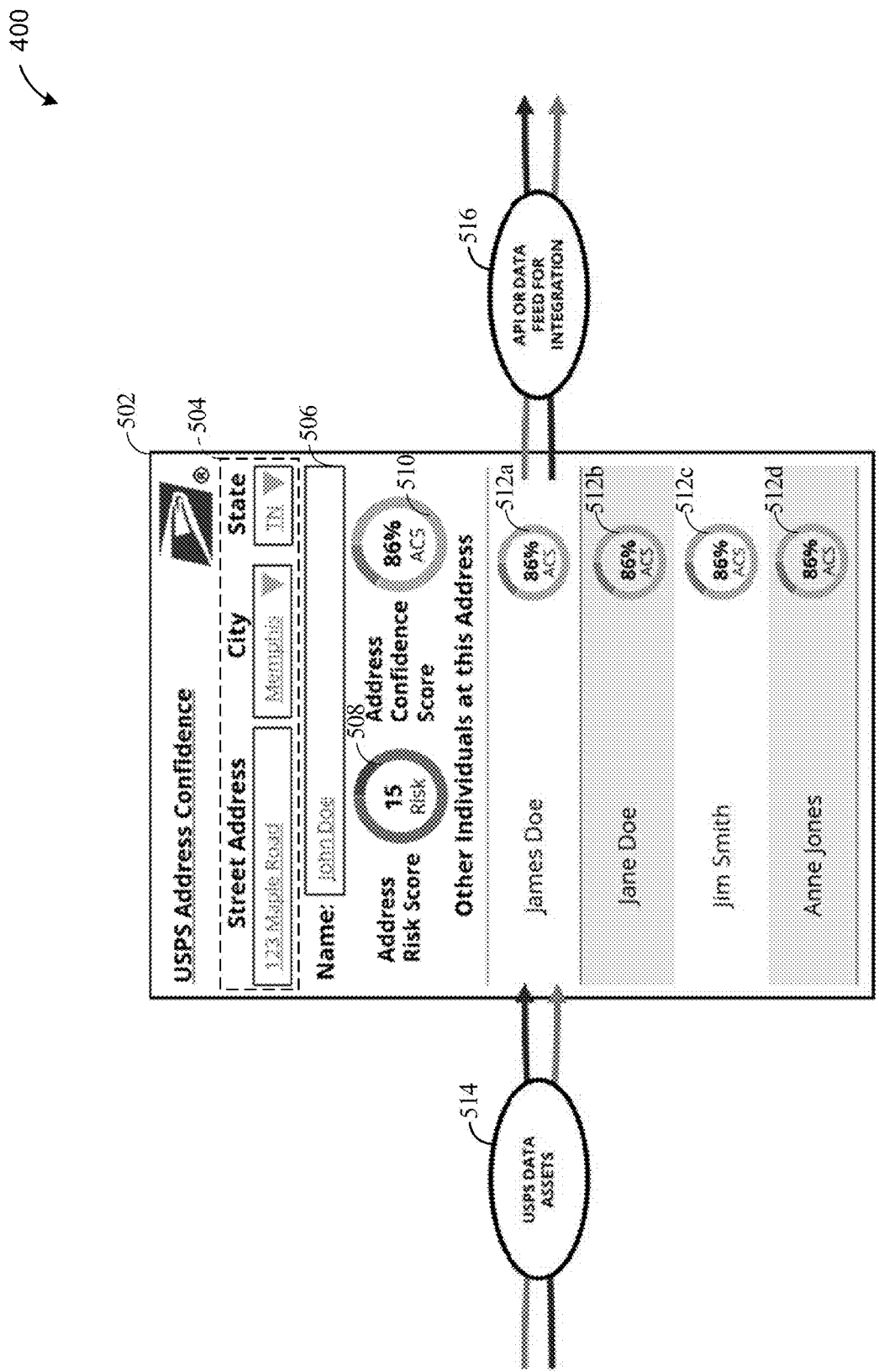
FIG. 5 is an example user interface that allows a user to interact with the processing system for generating delivery point information.

FIG. 5 is an example user interface 502 that allows a user to interact with the processing system 250 for generating address scores and volume shift values. The user may use the user interface 502 to identify one or more address scores (for example, one of the volatility score, confidence score, and risk score) or a volume shift value for an address or addresses. Additionally, the user may use the interface 502 (or a similar interface) to identify one or more addresses that meet a particular threshold score or volume shift value. For example, the user may desire to identify all addresses within a geographic area (for example, a ZIP code or similarly identified geographic area) that have an address confidence score of 86%.

The user may use the user interface 502 to enter address information into an address information field 504 (for example, street address, city, and state information). The user interface 502 may also include a name information field 506 through which the user can enter a particular name of interest. Additionally, the user interface 502 may further include an address risk score value 508 and an address confidence score 510. In some embodiments, the address risk score value 508 enables the user to select a threshold address risk score or displays an address risk score value.

For example, when the user enters a particular address or name into one of the address information field 504 and the name information field 506, the processing system 250 may process the information received via inputs 514 from one or more distribution network 100 assets to calculate the address risk score and the address confidence score associated with the entered address or name, which may include various data or information regarding addresses served by the distribution network 100. For example, the inputs 514 may include name and address information that the scoring module 258 uses to generate scores for a particular address or generate addresses that have particular address scores. For example, the address risk score value 508 and the address confidence score 510 depict the address risk score and the address confidence score for the address entered into the address information field 504 or the name information field 506. When the address risk score value 508 and the address confidence score value 510 indicate scores for the entered address or name, then the user interface may also include address confidence score values 512a-512d for each individual associated with the entered address or name. In some embodiments, the address confidence score values 512a-512d are equal to the address confidence score value 510 or are different from but average to the address confidence score value 510. Though not shown in FIG. 5, each of the individuals associated with the address or name entered are also assigned individual address risk scores that are equal to or average to the address risk score value 508.

When the user enters a particular address risk score and/or address confidence score into one or both of the address risk score value 508 and the address confidence score value 510, the processing system 250 may process the information received via the address risk score value 508 and/or the address confidence score value 510 via the inputs 514 from one or more distribution network 100 assets to identify the addresses and/or names that have matching address risk scores and/or address confidence scores. For example, the inputs 514 may include name and address information that the scoring module 258 uses to calculate scores for the particular address and then identify those addresses or names that meet particular threshold values entered into the address risk score value 508 and/or the address confidence score value 510. For example, the user can enter values into the address risk score value 508 (for example, 15) and the address confidence score 510 (for example 86%). The processing system 250 may then identify and show the names and/or addresses (for example, within a particular geographic area) that meet the entered address risk score or address confidence score (not shown in FIG. 5). In some embodiments, the user interface 502 may show addresses that have one or both of the address risk score and the address confidence score or show names of individuals that have one or both of the address risk score and the address confidence score. In some embodiments, the user interface 502 may show individuals associated with addresses shown having one or both of the address risk score and the address confidence score that meet the entered threshold. When user interface 502 identifies the addresses and individuals associated with the addresses, the user interface 502 also shows the address risk scores and the address confidence scores for each individual associated with the entered address or name. In some embodiments, the address confidence score for each individual is equal to the address confidence score value 510 or is different from but averages to the address confidence score value 510 (with the address confidence scores of other individuals associated with the address). Similarly, the address risk score for each individual is equal to the address confidence score value 510 or is different from but averages to the address risk score value 510 (with the address risk scores of other individuals associated with the address).

The user may also use the user interface 502 to enter address information into the address information field 504 and/or name information into the name information field 506. The processing system 250 may calculate the volume shift for the entered address or name and display the calculated volume shift value on the user interface 502. In some embodiments, the user interface 502 also shows other information associated with the volume shift, for example a day to which the volume is shifted, and so forth. In some embodiments, the user may enter a threshold volume shift amount or day and the processing system 250 may identify address or names that meet the entered volume shift information for display on the user interface 502.

The processing system 250 may use one or more of the scoring module 258 and the volume shift module 270 when identifying the addresses, names, or scores or volume shift values. For example, the scoring module 258 may be used to identify one of the confidence, risk and volatility scores for a particular address or to identify addresses that meet particular score thresholds, for example, a particular confidence score. Similarly, the volume shift module 270 may be used to identify volume shift values for a particular address or identify addresses that meet particular volume shift thresholds. Additional information can be found in the appendix attached hereto.

Figure 6:
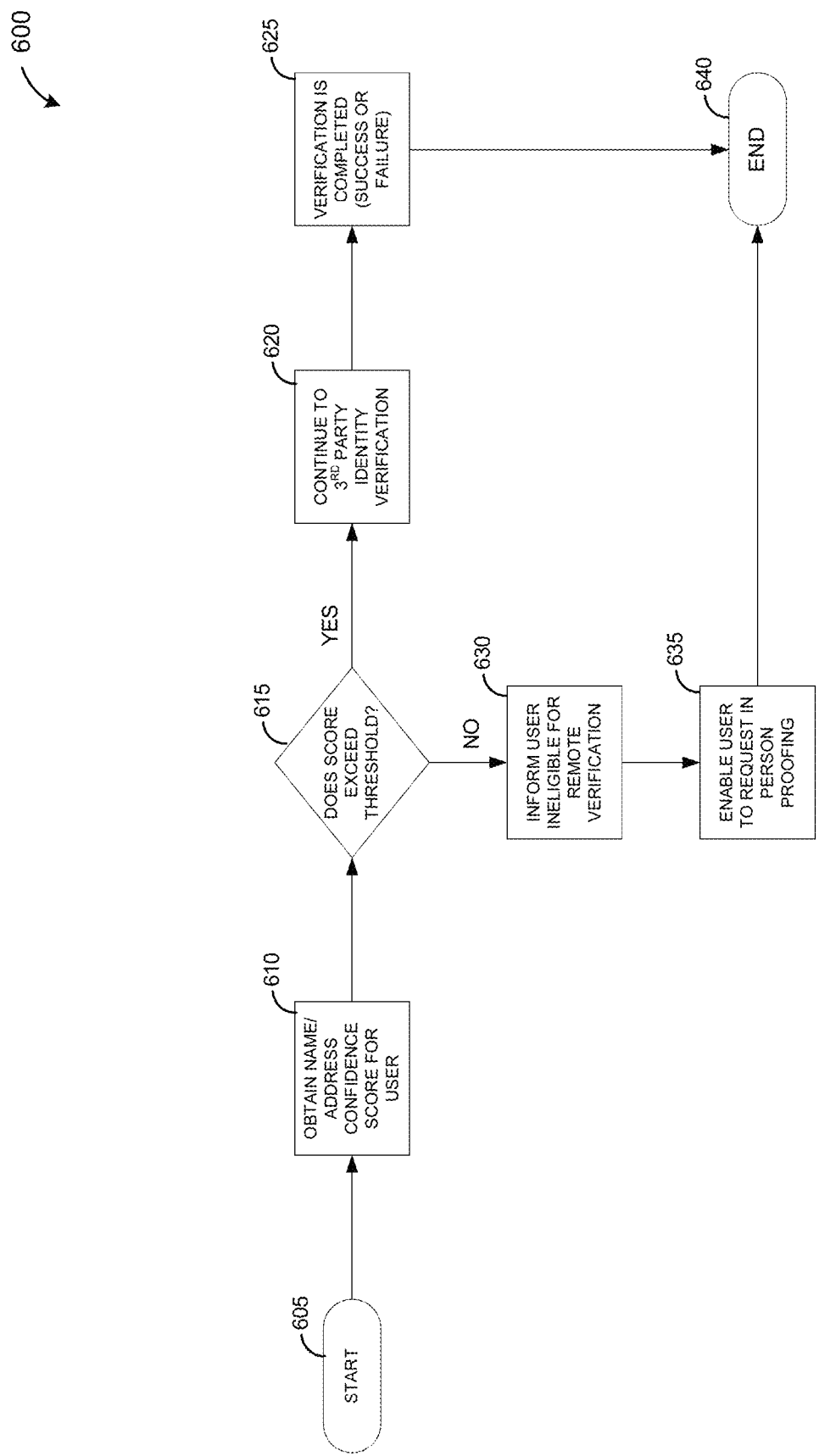
FIG. 6 is an example process flow where address scoring information as determined herein can be used in conjunction with other services offered by the distribution system diagram of a system architecture that implements the methods and processes of address scoring.

FIG. 6 is an example process flow 600 where address scoring information as determined herein can be used in conjunction with other services offered by the distribution network 100 diagram of a system architecture 200 that implements the methods and processes of address scoring. The process flow 600 provides an example of how one or more of the address scores described above can influence one or more services, products, etc., provided by the distribution network 100. For example, as shown in FIG. 6, the confidence score for an address and/or entity at the address can impact services available for the address and/or entity, for example identity verification services. For example, the process flow 600 of FIG. 6 shows how the confidence score for the address/entity can enable the entity to use third party identity verification services or not.

At block 605, the process flow 600 starts such that, at 610, the address scoring system 450 obtains an address score (for example, a confidence score) for the user and address (or delivery point) combination. If the obtained score exceeds a threshold value, as determined at block 615, then the address scoring system 450 proceeds to block 620, where the process flow 600 enables the $3^{rd}$ party identity verification to be completed at block 620 and 625 before the process flow 600 ends at 640. If the obtained score does not exceed the threshold value, as determined at block 615, then the address scoring system 450 proceeds to block 630, where the process flow 600 informs the entity that remote or $3^{rd}$ party identity verification is not possible because of the concerns with respect to the confidence score for the entity and/or address. At block 635, the process flow 600 enables the entity to request in person proofing, which can improve the confidence score for the entity. Thereafter, the process flow 600 terminates at block 640.

In some instances, the process flow 600 may be adapted to perform the process of confirming an identity of an entity (not shown). In such an adaptation, the process may comprise receiving a plurality of items for delivery to an address and obtaining, from the plurality of items, information regarding an entity associated with the items and the address. The process may also comprise delivering the plurality of items to the address, identifying, based on the obtained information, an expected identity of the entity, and receiving a request to confirm an identity of the entity using third-party identity verification via a user interface. The process may further comprise determining, based on the information regarding the entity, a confidence score for the expected identity, wherein the confidence score is a measure of a confidence that the expected identity accurately identifies the entity, comparing the confidence score to a threshold value, and determining whether the confidence score is greater than or equal to the threshold value. The process may additionally comprise generating a response to the request, the response including the confidence score and a result of the determining whether the confidence score is greater than or equal to the threshold value and displaying the response via the user interface.

In some instances, determining the confidence score for the expected identity comprises calculating a total number of items delivered to the address, a number of items delivered to the entity, and a number of items delivered to each other entity associated with the address. In some instances, determining the confidence score for the expected identity further comprises generating a probability score for the entity by dividing the number of items delivered to the entity by the total number of items delivered to the address. The process may further comprise applying probabilistic modeling to the probability score for the entity to generate the confidence score for the entity. The process may further comprise, when the confidence score is greater than or equal to the threshold value, applying the third party identity verification to confirm the identity of the entity.

Figure 7:
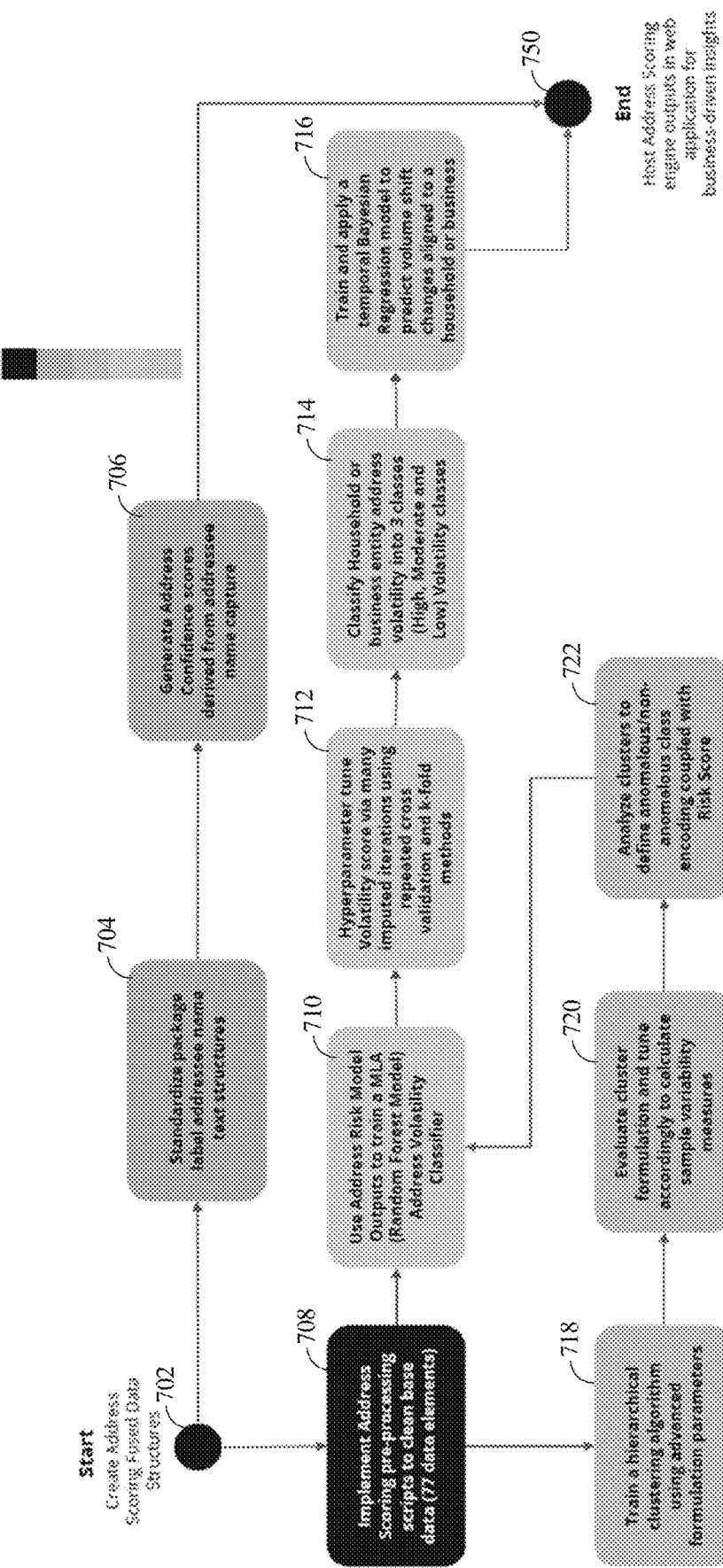
FIG. 7 is a flowchart of a process of generating scorings and similar outputs for the address scoring methods and processes as implemented, for example, by the system of FIG. 6.

FIG. 7 is a flowchart of a process of generating scorings and similar outputs for the address scoring methods and processes as implemented, for example, by the address scoring system 250 of FIG. 2B. The flowchart 700 includes steps that are specific to the address confidence score (for example, as applied or performed by the scoring module 258), the address risk score (for example, as applied or performed by the scoring module 258), the address volatility score (for example, as applied or performed by the scoring module 258), and the volume shift score ((for example, as applied or performed by the scoring module 258 and/or the volume shift module 270). One or more of the blocks of the method 700 may be performed by the system 200 and/or the address scoring system 250.

The method 700 begins at block 702, where the method 700 includes creating the address scoring fused data structure described herein. The data structure enables creation of the various scores described herein (for example, the confidence score, the risk score, the volatility score, the volume shift score). Additionally, the method 700 may include interactions between the different scores, as described further below.

As part of identifying the address risk score, the method 700 includes, at block 704, generating text structures for address information based on address information acquired from packages or mail items handled by the distribution network 100. The address information in the corresponding text structures may include name information, residence information, street address information, and the like. The address information in the text structures may include information for all individuals or entities at a given location. The method 700, at block 706, generates an address confidence score for the address information in the text structure, thereby deriving the address confidence score for that address and any related residents or individuals. Once the address confidence score is generated, this leg of the method 700 ends at block 750, with the address confidence score being output, for example to a user interface, a web application, and so forth.

At block 708, the method 700 includes implementing a pre-processing to parse and/or filter, etc., data used for The parsing and/or filtering of the data may comprise ensuring the data is in a proper format, that the data is complete, and so forth. The pre-processing may also comprise data management to ensure that the data is the proper data. The processed data can then be used for either an address volatility portion of the method 700 or address risk portion of the method 700. In the address volatility portion, at block 710, the method 700 includes applying a risk model to train a machine learning algorithm (for example, a Random Forest model, to identify classes for address volatility. At block 712, the method includes tuning the volatility score via many imputed iterations. The tuning may be completed based on repeated cross validation and k-fold methods. Based on the tuned data, the method 700 includes classifying each household or similar entity address into one of a number of classes (for example, high, moderate, and low) at block 714. At block 716, the method 700 includes training and applying an additional model, for example a Bayesian Regression model, to predict a volume shift expected at the address or experienced by the address. Once the address volatility score and the volume shift value is generated, this leg of the method 700 ends at block 750, with the volume shift value and volatility score being output, for example to a user interface, a web application, and so forth.

At block 718, the method 700 includes training an algorithm, such as a hierarchical clustering algorithm, using advanced formulation parameters. At block 720, the method 700 includes evaluating cluster formulation and tunes accordingly to calculate sample variability measures. At block 722, the method 700 includes analyzing the clusters to define anomalous class encoding coupled with the risk score. The method 700 then proceeds to block 710 and proceeds through blocks 710, 712, 714, and 716 (for example, because the volatility score may incorporate the risk score) before ending at 750, with the risk score being output, for example to a user interface, a web application, and so forth.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the processing system 250, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules. They may be represented in hardware or firmware. Generally, the modules described herein refer to logical modules that may be combined with other modules or divided into sub-modules despite their physical organization or storage.

A model may generally refer to a machine learning construct which may be used to automatically generate a result or outcome. A model may be trained. Training a model generally refers to an automated machine learning process to generate the model that accepts an input and provides a result or outcome as an output. A model may be represented as a data structure that identifies, for a given value, one or more correlated values. For example, a data structure may include data indicating one or more categories. In such implementations, the model may be indexed to provide efficient look up and retrieval of category values. In other embodiments, a model may be developed based on statistical or mathematical properties and/or definitions implemented in executable code without necessarily employing machine learning.

Machine learning generally refers to automated processes by which received data is analyzed to generate and/or update one or more models. Machine learning may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between proteins such as protein functions.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Those of skill will recognize that the various illustrative logical blocks, modules, circuits, and algorithm steps described as follows, and in connection with the embodiments disclosed herein may be implemented as electronic hardware, software stored on a computer readable medium and executable by a hardware processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

As will be understood by those of skill in the art, in some embodiments, the processes set forth in the following material may be performed on a computer network. The computer network having a central server, the central server having a processor, data storage, such as databases and memories, and communications features to allow wired or wireless communication with various parts of the networks, including terminals and any other desired network access point or means.

What is claimed is:

1. A method, comprising:
    receiving a plurality of physical items for delivery to a plurality of delivery addresses, the delivery addresses being in a determined geographic area;
    delivering the plurality of physical items to the plurality of delivery addresses;
    receiving, by one or more processors, from a plurality of distribution network sources, a wireless signal comprising item information and delivery information for the plurality of physical items and the plurality of delivery addresses to which the plurality of physical items are to be delivered;
    automatically generating, by the one or more processors, a fused data structure for each of the plurality of delivery addresses using the received item information and delivery information for the plurality of physical items delivered to each of the plurality of delivery addresses;
    storing, in a memory, the fused data structure for each of the plurality of delivery addresses;
    receiving, via a user interface, a request to identify a specific address of the plurality of delivery addresses that is associated with a specific behavior;
    analyzing the fused data structure generated for the specific address of the plurality of delivery addresses via a risk score engine;
    calling, in the risk score engine, the fused data structure to identify a quantity of physical items of a first item type delivered to a specific address and a quantity of physical items of a second item type delivered to the specific address, wherein the first item type is a promotional offer or a parcel, and wherein the second item type is a utility bill, or a tax bill;
    identifying a risk score for the specific address by comparing the quantity of physical items of the first type to the quantity of physical items of the second type;
    comparing the risk score to a threshold value;
    when the risk score is greater than or equal to the threshold value, determining that the specific address is associated with the specific behavior;
    providing, via the user interface, the risk score for the specific delivery address;
    generating a visualization identifying the plurality of delivery addresses and the risk score for the specific address;
    displaying the visualization via the user interface; and
    in response to determining the risk score is less than the threshold value, automatically sorting and routing, in item sorting equipment, a physical item from the plurality of physical items according to the specific address not associated with the specific behavior.

2. The method of claim 1, wherein determining, in the risk score engine, the risk score for the specific address comprises:
    identifying, in the fused data structure, aspects of the plurality of addresses in the determined geographic area wherein the aspects are based on historical item information and delivery information for the plurality of addresses and wherein the aspects are associated with the specific behavior;
    generating clusters from the plurality of addresses based at least in part on the identified aspects; and
    generating the risk score for the specific address based on the generated clusters.

3. The method of claim 2, wherein generating the risk score for the specific address further comprises identifying anomalous addresses based on:
    identifying delivery addresses of the plurality of delivery addresses that are not in one of the generated clusters;
    identifying delivery addresses of the plurality of delivery addresses in the generated clusters that have a value for an aspect that varies from the value for the aspect of other addresses in the generated cluster by a threshold amount;

determining whether the specific address is not in one of the generated clusters or has a value for an aspect that varies by a threshold amount; and assigning the risk score for the specific address based on the determination whether the specific address is not in one of the generated clusters or has the value for the aspect that varies by the threshold amount.

4. The method of claim 3, wherein the risk score assigned for the specific address exceeds the threshold value when the specific address is determined to be one of the identified anomalous addresses or does not exceed the threshold value when the specific address is determined to not be one of the identified anomalous addresses.

5. The method of claim 1, wherein the specific behavior comprises fraudulent behavior.

6. The method of claim 1, further comprising:
identifying, in the memory, recipient information for the plurality of physical items, the recipient information identifying a specific recipient at the specific address;
determining that the specific recipient is not associated with a delivery point in the fused data structure;
compare a volatility score for the specific address to a threshold volatility value, wherein the volatility score is a measure of a likelihood that the specific address experiences turnover with respect to associated entities over a period of time;
updating the memory to associate the specific recipient with the specific address when the volatility score exceeds the threshold volatility value;
generating a visualization identifying the volatility score for the specific address and an indicator that at least one entity is added to records in a database; and
displaying the visualization via a user interface.

7. The method of claim 6, further comprising determining the volatility score for the specific address based on historical item information regarding the specific address.

8. The method of claim 7, wherein determining the volatility score comprises identifying a change of address index for the specific address, wherein the change of address index comprises a comparison of change of address requests received for the specific address over two disparate time periods and provides a recency of turnover for the specific address.

9. The method of claim 8, further comprising applying a machine learning model to identify attributes of the historical item information most associated with the change of address index, wherein the identified attributes, as identified from the historical item information, correlate to aspects of the specific address that are commonly associated with high turnover of entities associated with the specific address.

10. The method of claim 9, wherein applying the machine learning model results in classifying the specific address in one of a plurality of classes each corresponding to a different level of volatility.

11. The method of claim 6, further comprising:
identifying approximately when the specific recipient stopped receiving physical items at the specific address;
identifying that the specific recipient started receiving physical items at a new address within a threshold period of when a first entity stopped receiving physical items at the specific address; and
updating the memory to associate the first entity with the new address.

12. The method of claim 1, wherein the plurality of physical items are physical mail pieces.

13. The method of claim 1, wherein the item information comprises an item type and wherein the delivery information comprises a quantity of physical items of the item type delivered to the specific address.

14. The method of claim 1, wherein the request to identify the specific address comprises a request to verify an entity associated with the specific address.

15. The method of claim 14, wherein the request is initiated by a financial institution and received via the user interface.

16. The method of claim 1, further comprising, in response to determining that the risk score associated with the delivery address is greater than or equal to the threshold value, routing, with item sorting equipment, a subsequent physical item associated with the risk score to a holding location.

* * * * *